United States Patent
Dahan et al.

(10) Patent No.: US 12,510,470 B2
(45) Date of Patent: Dec. 30, 2025

(54) SYSTEM AND METHOD FOR DETERMINING AQUEOUS NITRATE CONCENTRATION IN SOLUTION CONTAINING DISSOLVED ORGANIC CARBON

(71) Applicant: B.G. NEGEV TECHNOLOGIES AND APPLICATIONS LTD., AT BEN-GURION UNIVERSITY, Beer Sheva (IL)

(72) Inventors: Ofer Dahan, Midreshet Ben Gurion (IL); Elad Yeshno, Midreshet Ben Gurion (IL); Shlomi Arnon, Lehavim (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 120 days.

(21) Appl. No.: 18/569,282

(22) PCT Filed: Jun. 8, 2022

(86) PCT No.: PCT/IL2022/050611
§ 371 (c)(1),
(2) Date: Dec. 12, 2023

(87) PCT Pub. No.: WO2022/264121
PCT Pub. Date: Dec. 22, 2022

(65) Prior Publication Data
US 2024/0151639 A1    May 9, 2024

Related U.S. Application Data

(60) Provisional application No. 63/210,018, filed on Jun. 13, 2021.

(51) Int. Cl.
*G01N 21/31* (2006.01)
*G01N 33/18* (2006.01)

(52) U.S. Cl.
CPC ............. *G01N 21/31* (2013.01); *G01N 33/18* (2013.01); *G01N 2201/127* (2013.01)

(58) Field of Classification Search
CPC .. G01N 21/31; G01N 33/18; G01N 2201/127; G01N 2201/129; G01N 21/274; G01N 33/188; G01N 21/33
(Continued)

(56) References Cited

U.S. PATENT DOCUMENTS

2017/0299511 A1    10/2017    Palassis et al.
2020/0209208 A1    7/2020    Li et al.

FOREIGN PATENT DOCUMENTS

WO    2018/104939 A1    6/2018
WO    2020/250226 A1    12/2020

OTHER PUBLICATIONS

Extended European Search Report for European Patent App. No. / Patent No. 22824429.9-1001 / 4356110 PCT/IL2022050611, dated Mar. 17, 2025 (10 pages).
(Continued)

*Primary Examiner* — Md M Rahman
(74) *Attorney, Agent, or Firm* — McCormick, Paulding & Huber PLLC

(57) ABSTRACT

A method for real-time determining a concentration level of nitrate in a water sample collected from soil at a given site, the water sample contains an unknown composition and unknown concentration of DOC, the method includes: (A) during an offline stage: (a.1) obtaining a testing sample from the soil; (a.2) determining first and second wavelengths correlated, respectively, to concentration levels of the DOC and nitrate in the testing sample; (a.3) creating a calibration
(Continued)

equation for this site; and, (B) during real-time: (b.1) separately impinging on a real-time water sample from the soil light in said two wavelengths; (b.2) determining respective absorbances by the real-time sample in said two wavelengths; and (c) substituting the respective absorbances in the calibration equation to obtain the nitrate concentration in the real-time sample.

16 Claims, 20 Drawing Sheets

(58) Field of Classification Search
USPC .......................................................... 356/326
See application file for complete search history.

(56) References Cited

OTHER PUBLICATIONS

Elad Yeshno et al.: "Real-time monitoring of nitrate in soils as a key for optimization of agricultural productivity and prevention of groundwater pollution," Hydrology and Earth System Sciences, vol. 23, No. 9, 27, Sep. 27, 2019, pp. 3997-4010, XP055702841, European Geosciences Union, DOI: 10.5194/hess-23-3997-2019.

Jean Causse et al.: "Direct DOC and nitrate determination in water using dual pathlength and second derivative UV spectrophotometry," Water Research, Elsevier, vol. 108, Nov. 3, 2016, pp. 312-319, XP055556505, Amsterdam, NL ISSN: 0043-1354, ScienceDirect, DOI: 10.1016/j.watres.2016.11.010.

Avagyan Armine et al.: "Application of high-resolution spectral absorbance measurements to determine dissolved organic carbon concentration in remote areas," Journal of Hydrology, Elsevier, Amsterdam, NL, vol. 517, 2, Jun. 2, 2014, pp. 435-446, XP029007164, ISSN: 0022-1694, DOI: 10.1016/J.JHYDROL.2014.05.060.

Tuli et al. "In situ Monitoring of Soil Solution Nitrate: Proof of Concept". Soil Science Society of America Journal. Mar. 2009. vol. 73, No. 2. pp. 501-509.

Yeshno et al: "A novel analytical approach for the simultaneous measurement of nitrate and dissolved organic carbon in soil water". Hydrology and Earh System Sciences. Apr. 2021. vol. 25.pp. 2159-2168.

International Search Report mailed on Sep. 21, 2022, in connection with corresponding International Application No. PCT/IL2022/050611; 3 pages.

| Region | Sampled site/type | Soil texture classification | Average daily temperature (°C) | Average annual participation (mm) |
|---|---|---|---|---|
| North | Afek: open crop field | Clay soil | 17 - 25 | 569 |
| Center | Nir Galim: open crop field | Sandy loam | 15 - 26 | 504 |
| South | Conventional greenhouse | Sandy loam | | |
| | Organic greenhouse | Loam | 15 - 26 | 447 |
| N/A | "Dovrat" commercial humus mixture | N/A | N/A | N/A |

[a] N/A stands for not applicable.

[b] The data is averaged from 1995–2009 and is provided by the Israel Meteorological Services (IMS).

Fig. 5

| | Concentrations (ppm) | | | | Correlation coefficent $R^2$ | |
|---|---|---|---|---|---|---|
| DOC | 27.29 | 14.05 | 6.69 | 3.51 | 1.71 | |
| Nitrate | 525 | 221 | 666 | 202 | 479 | |
| Wavelength (nm) | Absorption (a.u.) | | | | | Nitrate | DOC |
| 220 | 3.2283 | 3.3288 | 3.3708 | 3.0918 | 3.1917 | 0.515 | 0 |
| 225 | 3.4265 | 3.0776 | 3.5152 | 2.9234 | 3.3278 | 0.658 | 0.003 |
| 230 | 2.7237 | 1.7404 | 4.009 | 1.581 | 3.1723 | 0.883 | 0.018 |
| 235 | 1.1995 | 0.7398 | 2.0882 | 0.6336 | 1.2925 | 0.98 | 0.001 |
| 240 | 0.5395 | 0.3238 | 0.743 | 0.2362 | 0.4377 | 0.967 | 0.018 |
| 335 | 0.0947 | 0.063 | 0.094 | 0.0377 | 0.0368 | 0.003 | 0.822 |
| 340 | 0.089 | 0.0598 | 0.0912 | 0.0364 | 0.0351 | 0.001 | 0.791 |
| 345 | 0.0846 | 0.0568 | 0.0891 | 0.0361 | 0.0341 | 0 | 0.77 |
| 350 | 0.0811 | 0.0569 | 0.0883 | 0.0348 | 0.0341 | 0 | 0.737 |

Fig. 7

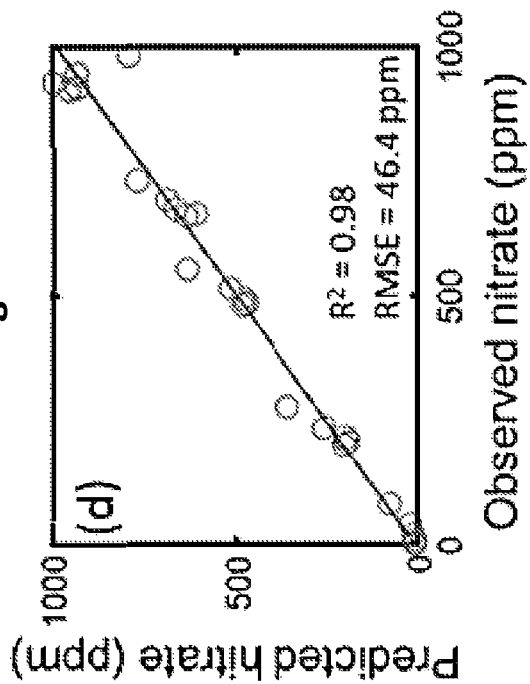
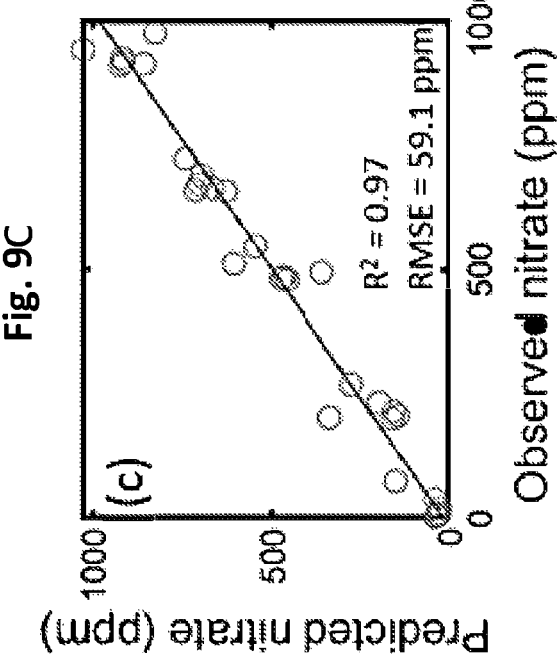
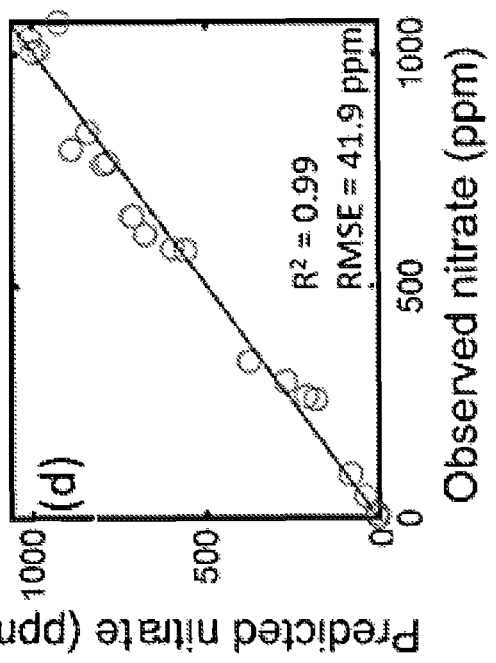
Fig. 9C
Fig. 9D
Fig. 9E

Fig. 11

| Sampled site | $P_{00}$ | $P_{10}$ | $P_{01}$ | $P_{20}$ | $P_{11}$ | $\lambda_{Nitrate}$ (nm) | $\lambda_{DOC}$ (nm) | $R^2$ | RMSE (ppm) |
|---|---|---|---|---|---|---|---|---|---|
| Afek: open crop field | -7.27 | 925.56 | -690.86 | -106.66 | 441.81 | 239 | 259 | 0.99 | 39.8 |
| Nir Galim: open crop field | 7.83 | 300.74 | -409.1 | 50.38 | -58.19 | 236 | 257 | 0.98 | 46.4 |
| Conventional greenhouse | 36.51 | 521.13 | -702.04 | 11.54 | 17.06 | 237 | 256 | 0.97 | 59.1 |
| Organic greenhouse | 5.53 | 115.4 | -317.06 | 59.72 | -213.76 | 234 | 362 | 0.99 | 41.9 |
| Humus mixture | 0.09 | 139.96 | -379.01 | 17.65 | -142.81 | 232 | 342 | 1 | 5.6 |
| Organic greenhouse* | 46.42 | 81.29 | -152 | 64.68 | -60.7 | 234 | 259 | 0.97 | 56.6 |
| Humus mixture* | -4.357 | 137.3 | -151.5 | 17.64 | -47.95 | 232 | 259 | 0.99 | 6.94 |

*Calibration coefficients obtained for 259 nm.

SYSTEM AND METHOD FOR DETERMINING AQUEOUS NITRATE CONCENTRATION IN SOLUTION CONTAINING DISSOLVED ORGANIC CARBON

CROSS-REFERENCE TO RELATED APPLICATIONS

This application is a National Stage application of International Patent Application No. PCT/IL2022/050611, filed on Jun. 8, 2022, which claims priority to U.S. Provisional Patent Application No. 63/210,018, filed on Jun. 13, 2021, each of which is hereby incorporated by reference in its entirety.

TECHNICAL FIELD

The invention relates in general to systems and methods for optimizing agricultural crops' yields while reducing water contamination due to excess application of fertilizers. More specifically, the invention relates to a system and method for determining a level of nitrate and Dissolved Organic Carbon (DOC) in a water sample, thereby to determine accurate amount of fertilization necessary.

BACKGROUND

Contamination of rivers, lakes, fresh water, drinking water, groundwater and soil pore water by nitrate is a global problem. The term "nitrate" is briefly referred to herein also as "N". It is universally recognized that nitrate contamination of drinking water is a threat to human health. It is also reported that human health suffers from adverse effects, even cancer, due to continual exposure to nitrate above a certain level. A significant rate of water pollution results from excess fertilization by farmers due to a lack of real-time and accurate information regarding the nutrient availability in the soil. Therefore, an excess of fertilization results in a waste of resources and pollution of the groundwater, particularly by nitrate.

During the second half of the 20$^{th}$ century, clear trends of nitrate concentration increase in groundwater have been observed in aquifers all over the globe. The World Health Organization (WHO) has determined that nitrate levels in drinking water should not exceed 50 ppm. When exceeding this concentration level, nitrate is harmful to infants by increasing the danger of "blue-babies syndrome" (methemoglobinemia), leading to severe illness, and even death. Unfortunately, nitrate contamination is the most dominant factor responsible for severely degrading groundwater and surface resources. On a global scale, eutrophication and hypoxia of streams, rivers, and lakes, are mainly attributed to subsurface return flow from nitrate contaminated groundwater, leaking from phreatic aquifers underlying agricultural fields.

Moreover, the impact of nitrate-contaminated groundwater is not limited to terrestrial water resources, as it significantly impacts marine ecosystems as well. For example, eutrophication and hypoxia on a large scale have been found in the Gulf of Mexico and the Black Sea, and severe impacts on the Great Barrier Reef, Australia, have been observed. Overall, nitrate contamination had led to more groundwater disqualification and water well shutdowns than any other contaminant worldwide. While nitrate is considered the most common non-point source pollutant in groundwater, numerous studies have linked the increase of nitrate concentration in groundwater to the excess use of fertilizers in agriculture. As a result, a global regulatory takes place by environmental protection and water authorities to reduce the excessive application of agricultural fertilizers. For example, the European Union has established the Nitrates Directive, and the US Environmental Protection Agency (EPA) regards nitrate contamination in groundwater as an event requiring immediate action.

At present, fertilizer application in agriculture relies primarily on farmers' experience, expert recommendations, and sporadic soil testing. Unfortunately, none of these techniques provide information in line with the time scale of N-fertilizers mobilization (nitrate's solution movement rates through the soils sediments), consumption, and transformation dynamics in the soil.

Presently, the monitoring of chemical parameters in soils is performed in water samples that may be obtained, for example, by a suction cup mounted in the soil or by extracting soil samples. Water samples collected by this mechanism are typically transferred to a laboratory for further chemical analysis or analyzed on-site through an analytical kit. However, nitrate in the soil is highly soluble, mobile, and is consumed by the crops. Moreover, nitrate concentration in the soil may fluctuate in time scales of hours to days due to different irrigation schemes, precipitation, fertilization, root uptake, and different plant growth phases. As such, conventional tools' monitoring of nitrate concentration does not meet the required time resolution for optimizing fertilization schemes while preventing groundwater pollution due to excessive fertilization. Moreover, current techniques typically require handling of the samples and laboratory analyses by a devoted research team, yet not by farmers.

Tuly et al., (2009), "In Situ Monitoring of Soil Solution Nitrate: Proof of Concept", https://www.researchgate.net/publication/231523625, suggests a technique for continuous monitoring of nitrate concentrations in soil solution. Absorbance spectroscopy is applied to a sample within a stainless-steel porous cup installed in the soil. The porous cup is filled with deionized water and placed in a potassium nitrate solution reservoir. Once the solution inside the cup achieves chemical equilibrium by diffusion between the porous cup and the surrounding medium, the absorption spectrum of the solution is measured through a UV dip probe. Tuly et al. (2009) proposed setup uses a UV light source and a dip probe connected to a spectrophotometer via optical fibers to continuously determine the nitrate concentration within the cup. However, this technique has limited applicability for two main reasons: (a) the obtaining of chemical equilibrium between the porous cup and the surrounding medium, especially in unsaturated sediment with limited water storage, is rather slow, resulting in a time lag between the actual variation of the nitrate concentration in the soil to its actual measurement. Therefore, rapid concentration variations, as expected following intensive irrigation or fertilization events, may not be recorded; and (b) the presence of natural soil Dissolved Organic Carbon (DOC) limit the accuracy of UV absorption by employing spectroscopy analysis since both nitrate and soil DOC absorb UV light in overlapping wavelengths ranges.

WO 2018/104939, Yeshno et al. suggests a nitrate concentration determination technique based on a continuous spectral analysis of soil porewater in an optical flow cell. The optical flow cell is connected to a porous interface which obtains a continuous flux of soil porewater. The absorption spectrum of the soil porewater is continuously recorded and analyzed to determine in real-time the nitrate concentration. The analysis involves a scan of the absorption spectrum of the soil porewater to identify a single optimal wavelength where DOC interference to nitrate measurement is minimal. However, despite the capability of the system to continuously measure nitrate concentration in situ, the system's large dimensions, along with its high energy consumption, is too bulky and expensive for practical and commercial applications.

In brief, the prior art optical system of WO 2018/104939 for determining a level of nitrate in a cultivated soil mainly requires the following components:

a. One or more sampling cells, each enabling the extraction of a porewater sample from a specific region of the soil;
b. Each sampling cell is connected to an optical flow cell for continuous or frequent spectral analysis of the soil porewater;
c. A UV light source for applying a light beam in wavelengths between 200-240 nm through the water sample in the flow cell;
d. A photodetector or a spectrophotometer for accumulating light from the light beam, following its passage through the water sample;
e. A processing unit for determining the level of light-absorption (based on Beer-Lambert equation), and
f. A processing unit estimating nitrate concentration based on previously prepared empiric calibration equation. The calibration equation is obtained by an algorithm that determines a single optimal wavelength, where a minimal interference from DOC is found;
g. WO 2018/104939 also shows how the system can perform analyses on a plurality of different soils, while each time, a single region is selected for analysis.

WO 2020/250226 (Arnon et. al) discloses a system that includes (a) a first illuminator configured to illuminate a sample within a cell by light in a first wavelength and a first photodetector for collecting the first-wavelength illumination, following the light passage through the sample; (b) a second illuminator configured to illuminate the sample within the cell by light in a second, fluorescence-excitation wavelength, and a second photodetector for collecting illumination in a third, fluorescence-emission wavelength from the sample. An analysis unit determines the nitrate+DOC impact on the absorption spectrum as measured by the first photodetector, and it further determines the DOC concentration based on the fluorescence emission as measured by the second photodetector. Based on the two determinations, the nitrate concentration is found.

SUMMARY

It is an object of the present invention to provide a system for determining in real time and in-situ a level of nitrate in soil, which is simpler in structure, compact in size, and of lower cost compared to similar prior art systems.

It is a particular object of the invention to eliminate the effects of DOC existing in a porewater sample on the absorption, thus to enable the determination of aqueous nitrate concentration in the solution in the presence of DOC.

It is still an object of the invention to provide a system for determining the correct nitrate level in an unknown sample, given previous analysis of DOCs in several different soils.

Other objects and advantages of the invention will become clear as the description proceeds.

The invention relates to a method for determining a concentration of nitrate in a water sample collected from soil at a given site, the water sample also contains an unknown composition and unknown concentration of DOC, the method comprising:

a. during an offline stage:
  collecting a testing sample from the site;
  analyzing the testing sample to determine a first wavelength in which a light absorbance by the testing sample is correlated to the concentration level of the DOC in the testing sample;
  further analyzing the testing sample to determine a second wavelength in which a light absorbance by the testing sample is correlated to the concentration level of the nitrate in the testing sample;
  based on the above two-step offline analysis, creating a multivariate polynomial calibration equation for use during a real-time stage analysis; and
b. during a real-time stage analysis:
  collecting in real-time a water sample (naturally containing Nitrate+DOC) from the site's soil;
  impinging on the real-time sample light in the first wavelength, measuring the real-time sample's absorbance, and recording the measured absorbance as a first absorbance value;
  impinging on the real-time sample light in the second wavelength, measuring the real-time sample's absorbance, and recording the measured absorbance as a second absorbance value;
  substituting in the calibration equation the first absorbance value and the second absorbance value or values relative thereon and calculating to determine the nitrate concentration in the real-time sample.

In an embodiment of the invention, the offline stage comprises a creation a calibration matrix of samples from the from the testing sample, and wherein said analyses steps are performed on the calibration matrix.

In an embodiment of the invention, at least one of said correlations is a linear or higher order correlation.

In an embodiment of the invention, the offline stage is performed separately for each site, to determine a calibration equation that is specific to each site.

In an embodiment of the invention, the first wavelength and the second wavelength are determined by:
  dividing the calibration matrix of samples to a plurality of sub-samples, and dividing the plurality of sub-samples to two groups;
  differently enriching in a controlled manner the sub-samples in the first group by nitrate;
  differently diluting in a controlled manner the sub-samples in the second group by DDW;
  dividing a wide light spectrum into a plurality of wavelengths to form a plurality of discrete wavelengths;
  in each discrete wavelength, impinging light on each sub-sample within the two groups, and recording respectively the absorbance by the sub-sample; and
  analyzing the respective absorbances to determine the first wavelength and the second wavelength.

In an embodiment of the invention, the creation of the calibration equation is based on applying a multivariate regression technique on the variety of recorded absorbances.

In an embodiment of the invention, the method is further used to determine the concertation of DOC in the sample.

The invention also relates to a system for determining in real-time a concentration of nitrate in a water sample collected from soil at a given site, the water sample also contains an unknown composition and unknown concentration of DOC, the system comprising:

a first light source operating at a predetermined first wavelength in which light absorbance by the sample is correlated to a concentration level of DOC in the sample;

a second light source operating at a second wavelength in which light absorbance by the sample is correlated to a concentration level of nitrate in the sample;

at least partially transparent cell for containing the water sample, wherein each the light sources is directed to impinge light on the cell containing the sample; and an analysis unit receiving a first sample absorbance in the first wavelength, and a second sample absorbance in the second wavelength, and calculating the concentration of nitrate in the sample based on the two absorbances, and a predetermined calibration equation.

In an embodiment of the invention, at least one of said correlations is a linear or higher order correlation.

In an embodiment of the invention, at least one of the light sources are of LED or UV lamp.

In an embodiment of the invention, the predetermined calibration equation is specifically determined for the given site.

In an embodiment of the invention, the system is also used to determine the concentration of the DOC in the water sample.

In an embodiment of the invention said correlations define spectrum regions, respectively, in which the extent of correlation $R^2$ is larger than 0.8.

In an embodiment of the invention, the correlations are define spectrum regions, respectively, in which the extent of correlation $R^2$ is higher than 0.85, 0.9, 0.95, or 0.98 in either or both said concentration levels determinations.

BRIEF DESCRIPTION OF THE DRAWINGS

In the drawings:

FIG. 5 provides additional information on selected soils, such as the sampled field site locations, site types, and texture classifications;

FIG. 7 shows additional experimental results;

FIGS. 9A-9E show observed vs. predicted nitrate concentrations as obtained for: (a) a humus mixture, (b) Afek: open crop field, (c) a conventional greenhouse, (d) Nir Galim: open crop field, and (e) an organic greenhouse;

FIG. 11 shows calibration coefficients obtained by the multivariate regression model, selected wavelengths, and statistics;

DETAILED DESCRIPTION

Figure 1:
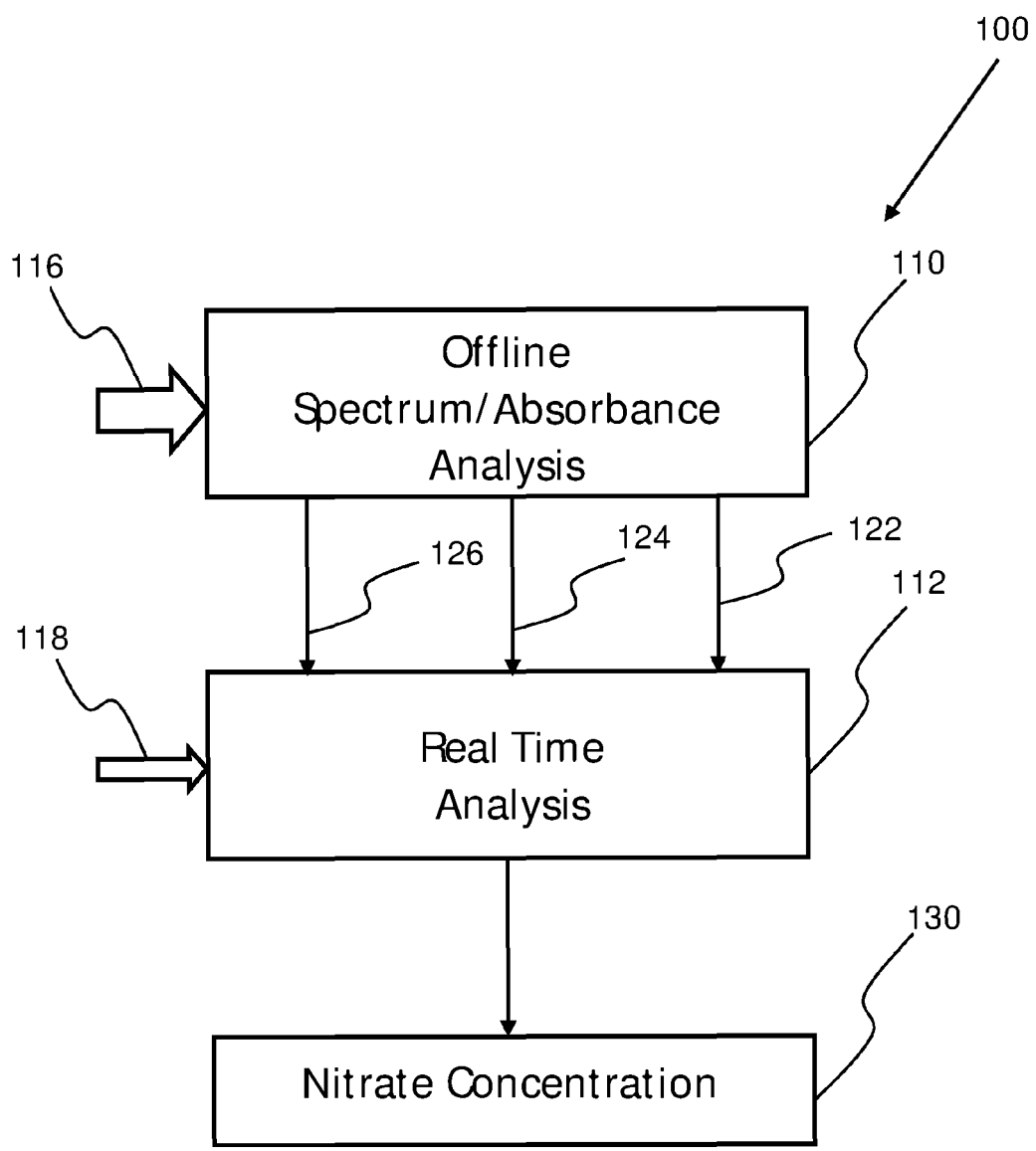
FIG. 1 illustrates the general procedure 100 of the invention in a flow diagram, performed separately for each site.

As noted, light-absorbance-based analytical methods to determine nitrate concentration in soil porewater samples pose a great challenge since dissolved organic carbon (DOC), which is commonly found in soil porewater, overlaps with the nitrate absorption spectrum, thus interfering with the nitrate spectral analysis.

The inventors have found that the DOC composition that significantly varies from site to site highly affects the accuracy of the determination of nitrate concentration.

The present invention provides an optical system for determining the nitrate concentration in real-time and in situ in cultivated soil, which overcomes the drawbacks of the prior art systems. In brief:

a. The invention mainly involves two steps: (i) An offline stage in which at least two wavelengths are determined, as well as a calibration equation for use during real-time operation; and (ii) a real-time stage in which the nitrate concentration is determined by impinging light (in two specific predetermined wavelengths) on the sample, measuring the absorbance by the sample, and determining the nitrate concentration utilizing the calibration equation.

b. The offline stage is performed separately for each specific site for which the nitrate concentration's determination is desired. During the offline stage, samples from the site are examined to find two light wavelengths, as follows: (i) a first wavelength showing high correlation (linear or higher order correlation, as shown, for example, by the second order polynomial equation) between different rates of DOC and respective light absorbances in manipulated samples from the site; and (ii) a second wavelength showing high correlation (linear or higher order correlation, as shown, for example, by the second order polynomial equation) between different known rates of nitrate concentrations and respective light absorbances in manipulated samples from the site.

c. The absorbance values, as measured during the offline stage, along with the known rates of nitrate and DOC concentrations, are analyzed using, for example, multivariate regression analysis to generate the calibration equation that reduces the DOC interference at the absorbance spectrum. In such a manner, nitrate concentration in the examined solution can be determined during the real-time stage. The calibration equation is specific to each examined site. When used during real-time measurements, the calibration equation provides a tool for subtracting the effect of DOC on the absorbance from the combined effect of nitrate plus DOC on the absorbance, resulting in the nitrate concentration.

d. The system of the invention, in its basic form, utilizes two pairs of monochromatic light emitter-photodetector each. Each pair of monochromatic components operates in a distinct wavelength. During real-time, the light source (emitter) transmits light in the respective wavelength onto a cell containing a water sample from a specific soil, and the respective photodetector accumulates the light passing through the sample. In such a manner, the sample absorbance is determined as the difference between the emitted and the accumulated lights. As noted, this absorbance difference is separately measured in at least two distinct wavelengths. It has been found that low-cost and low-energy components, such as LED/UV lamp light sources and semiconductor-type photodetectors, can be used in most cases, considering the respective two wavelengths applied.

e. The respective absorption measurements in the two discrete central wavelengths and the
calibration equation are utilized in real-time to evaluate the absorptions and determine the real-time nitrate concentration in the site.

FIG. 1 illustrates the general procedure 100 of the invention in a flow diagram, performed separately for each site. In the offline stage 110:

(A) Two distinct wavelengths are determined, (a) a first wavelength 122 showing the highest correlation between DOC concentrations and respective light absorbances; and (b) a second wavelength 124 showing the highest correlation between nitrate concentrations and respective light absorbances.

(B) Additionally, and based on the measurements, a multivariate (polynomial) calibration equation 126 is prepared for use during the following real-time stage. The coefficients within the equation are based on absorbance rates as determined in the offline stage.

There are several techniques for making such offline determinations of the two wavelengths and the multivariate calibration equation. One technique is described later in the description.

Given the two determined wavelengths, 122 and 124, respectively, and the calibration equation 126, the real-time stage 112 is performed in situ. The two pairs of components, each containing a light source and a photodetector, are used during the real-time stage. The first pair of light source-photodetector operating in the first wavelength 122 and the second pair of light source-photodetector operating in the second wavelength 124 are utilized. A water sample 118 is collected from the site's soil, for example, by a suction cup. Sample 118 is lighted by each of the two light sources, and the collected light by each respective photodetector allows the determination of the respective absorbances. The respective absorbances are then substituted in equation 126, and the nitrate concentration level 130 within the sample is determined.

Figure 2:
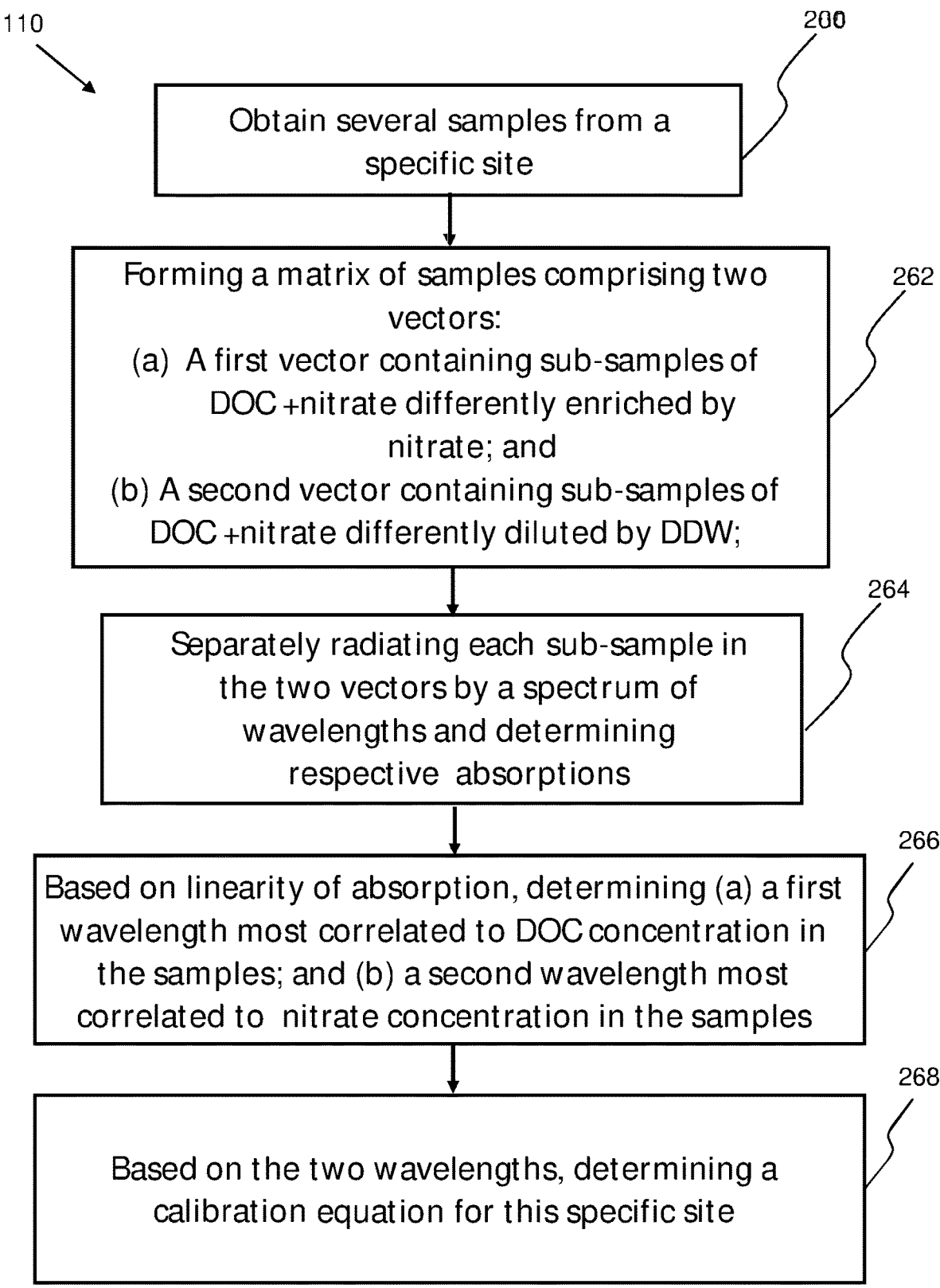
FIG. 2 generally describes an example for performing the offline procedure.

FIG. 2 generally describes an example for performing the offline procedure 110. In step 260, several samples are obtained from the site (or a single sample volume is divided into a plurality of samples). In step 262, two sample vectors are formed: (i) A first sample vector containing samples of DOC plus nitrate, each sample being differently enriched by nitrate (i.e., enriched by different levels of nitrate, respectively); and (ii) A second vector containing samples of DOC plus nitrate, each sample being differently diluted by DDW.

In step 264, each vector is separately radiated (scanned) in different wavelengths within a predefined spectrum, and the absorption values in each radiated wavelength, respectively, are recorded. Naturally, the absorption value is the difference between the emitted light (at the respective wavelength) and the light accumulated by the respective photodetector in the same pair. In step 266, two wavelengths are determined: (a) a first wavelength linearly (preferably most linearly) correlated to DOC concentration in the samples; and (b) a second wavelength linearly (preferably most linearly) correlated to the nitrate concentration in the samples (again, with the negligible effect of DOC). An example of how these two wavelengths are determined is described later in the description. Finally, in step 268, a multivariate calibration equation is developed based on the analysis of step 216. This calibration equation is used during the real-time (analysis) stage 130 (FIG. 1).

It should be noted that said linear correlations are preferable but not necessary. Other types of "correlation" or "most correlations" may also apply, such as a second-order polynomial correlation, etc. By "correlation," it is meant a spectrum region in which a respective $R^2>0.8$ applies. In other embodiments, the "correlation" value is selected where one of: $R^2>0.85$, $R^2>0.9$, $R^2>0.95$, or $R^2>0.98$ is applied in either or both of the nitrate or DOC cases. The "correlation" level need not be the same for the nitrate and DOC.

Figure 3:
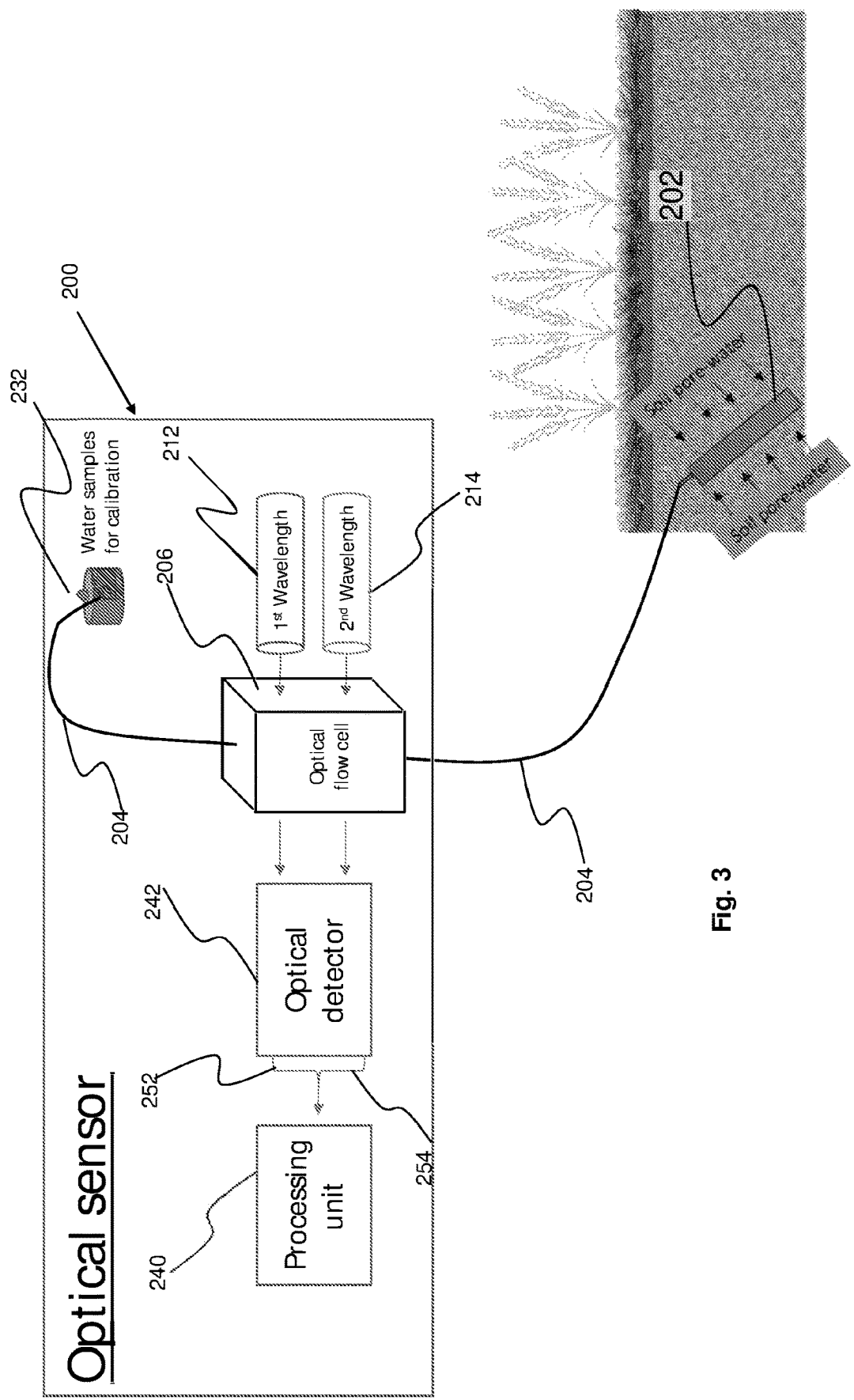
FIG. 3 schematically illustrates a system for real-time determination of nitrate concentration in soil porewater, according to an embodiment of the invention.

FIG. 3 schematically illustrates system 200 for real-time determining nitrate concentration in soil porewater, according to an embodiment of the invention. A porous interface (suction cup) 202 is placed in the soil to obtain a continuous low flux stream of soil porewater solution. The soil porewater flows through an optical flow cell 206 via small diameter tubing 204 (e.g., inner diameter ≤1.6 mm, and possibly in the range of between ⅛" and ¼"). These dimensions are given for the sake of non-limiting examples. The sample extraction from the soil is driven, for example, by applying low pressure (vacuum) on the porous interface. The sample can later be discharged or accumulated for possible further analysis or system calibration at sample accumulation chamber 232. The casing of flow cell 206 is partially transparent to allow the passage of light beams. A first light source 212, preferably of LED type, illuminates the cell in a first wavelength (as determined in the offline stage). The light beam of the first light source 212 passes through the optical flow cell 206, in which the soil porewater flows, while some of the light beam's energy is absorbed by the water constituents (containing nitrate and DOC). The remaining energy from the light beam of the first light source 212 is accumulated by a photodetector 242, forming an absorbance signal 252. Processing unit 240 is used to calculate the absorbance signal, which reflects the difference between the illumination intensity by the first light source 212, and the light intensity accumulated by photodetector 242 (for example, by applying a Beer-Lambert equation). The first signal 252, resulting from the nitrate concentration plus DOC, highly correlates to the nitrate concentration. A second light source 214, preferably of a LED type, illuminates cell 206 in the second wavelength, as determined during the offline stage. The light beam from the second light source 214 also passes through the sample. The light passage is highly proportional to the DOC concentration within the DOC plus nitrate sample and is substantially independent of the nitrate concentration. The absorption resulting from the second light beam is accumulated by the photodetector 242, forming an absorption signal 254. Signal 254 is conveyed to the processing unit 240, where the calibration equation 216 is used to find the nitrate concentration in the sample. As previously mentioned, the first absorption signal is highly proportional to the DOC concentration in the solution, while the second absorption signal is highly proportional to the nitrate concentration in the sample.

It should be noted that the wavelength correlated to the concentration of nitrate can be determined from other sources, such as from known tables. The wavelength correlated to the DOC has to be determined from the site's sample, as it highly depends on the specific composition of the DOC in that sample.

Further Discussion and Experiments

The invention provides an analytical procedure for measuring nitrate concentration in soil porewater, even when containing very high DOC concentrations (up to 200 ppm). The analytical method is based entirely on absorption spectroscopy. The invention includes an offline stage during which a calibration procedure is performed. The procedure includes analyzing the absorbance spectrum of a matrix of soil water solutions with known nitrate and DOC concentrations. The absorption spectrum of the soil water solutions is analyzed to identify two discrete wavelengths: (a) a second wavelength where the absorbance values exhibit the highest correlation to the nitrate concentration and (b) a first wavelength showing high affinity to the DOC levels and no nitrate absorption. Analyses of the information from the two wavelengths enable a reduction in the interference between DOC and nitrate absorbances at the wavelength having a high affinity to nitrate absorption. The approach was successfully tested on soil water obtained from five agricultural soils. The simple analytical approach of the invention, which is based on absorption spectroscopy, enables the development of a low-cost, real-time nitrate sensor. Additionally, the spectral analyses, based on the absorbance at two discrete wavelengths, can potentially be performed using two simple UV LEDs as the light sources and simple narrow wavelength range photodetectors.

Figure 4:
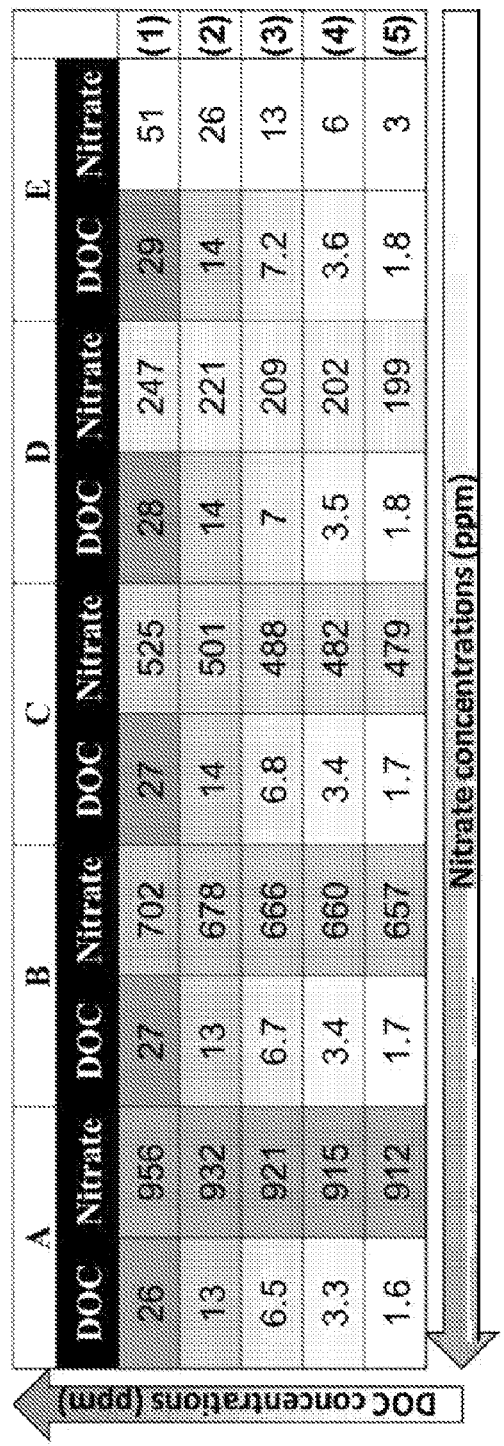
FIG. 4 shows the diluted samples (by DDW) and enriched samples (by nitrate), as used in experiments.
Figures 6A, 6B:
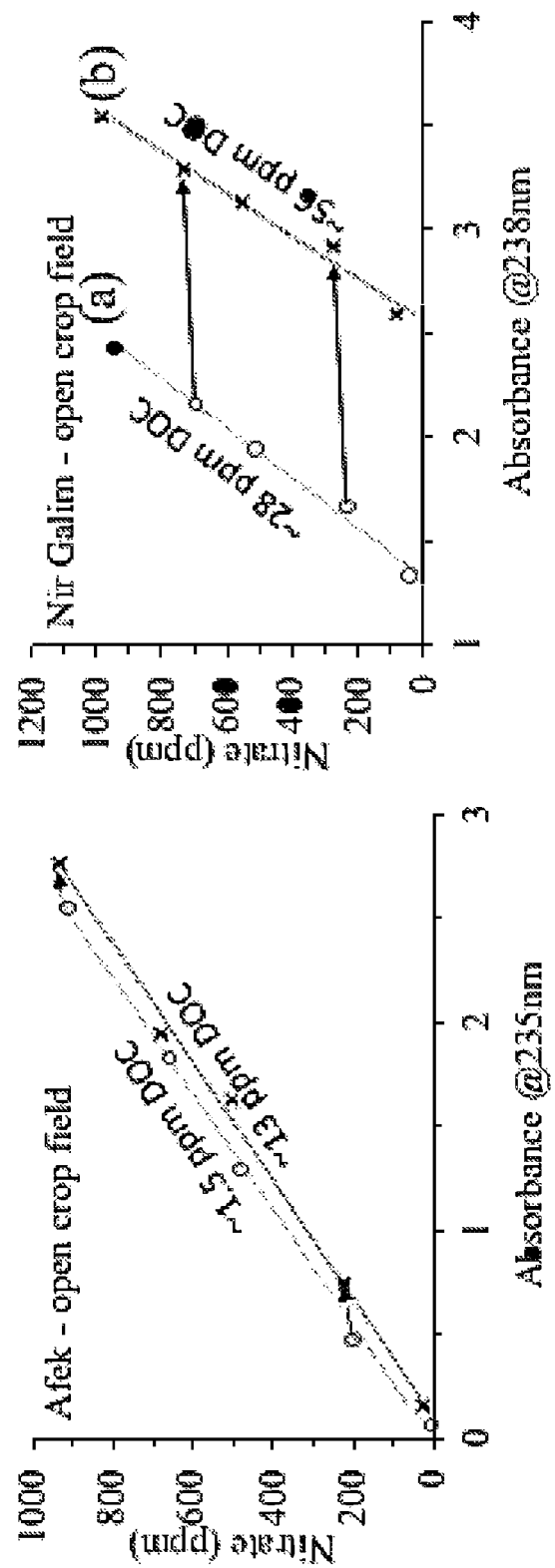
FIGS. 6A-6E show experimental results in graph form, as obtained for soils from 5 different sites.
Figure 6D:
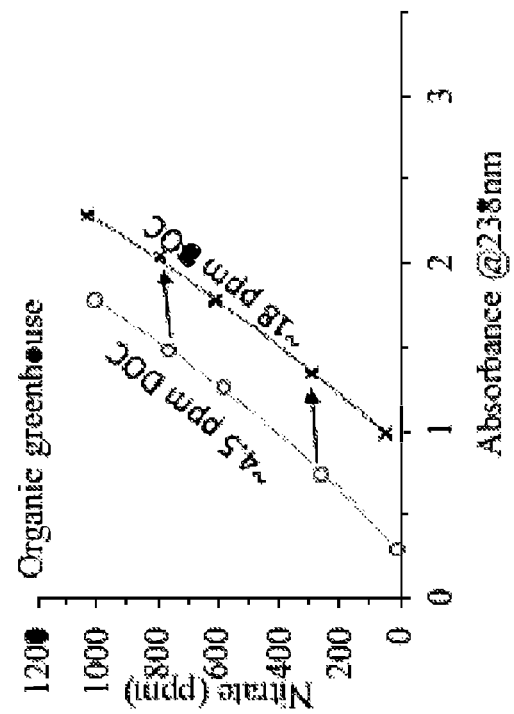
Figure 6C:
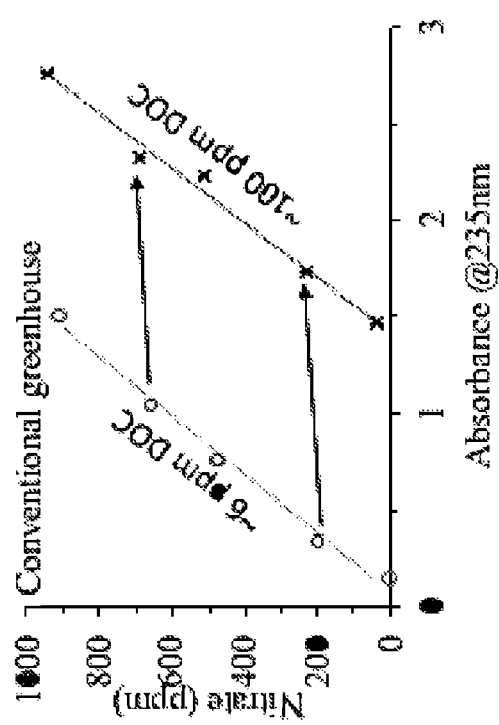
Figure 6E:
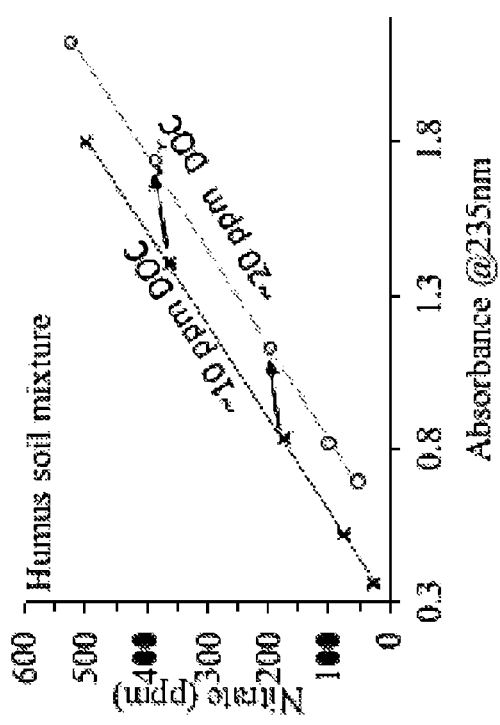
Figure 8A:
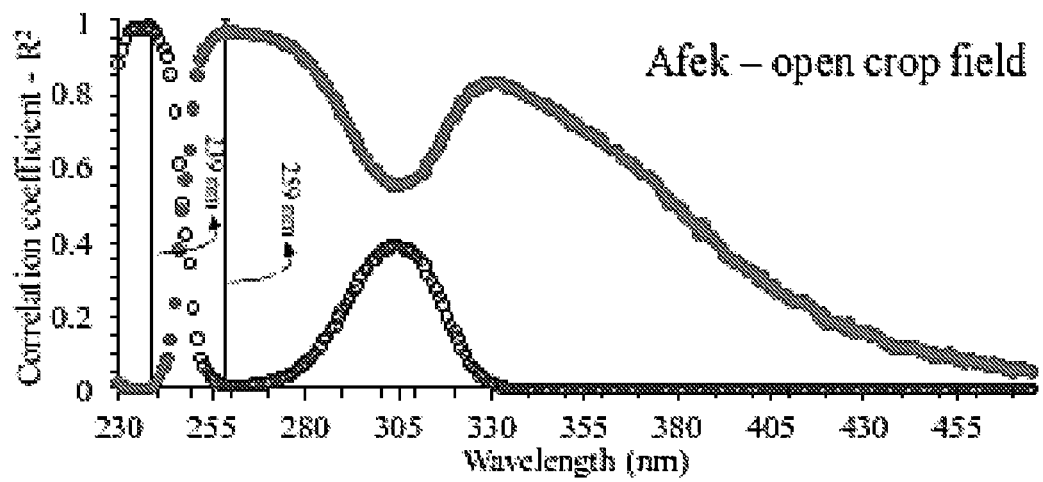
FIGS. 8A-8E show several graphical plots, each showing the correlation coefficient values ($R^2$) vs. the corresponding wavelength, as obtained for soils from different sites.
Figure 8B:
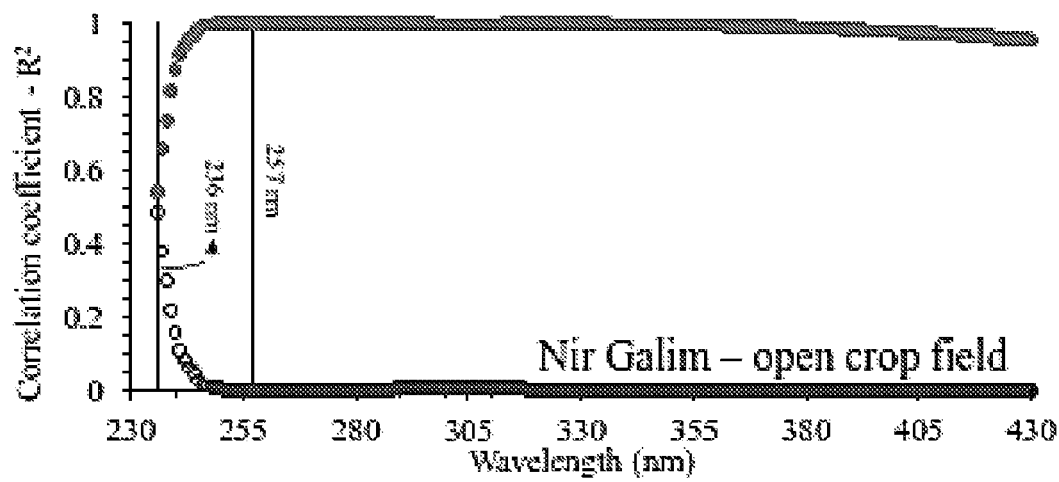
Figure 8C:
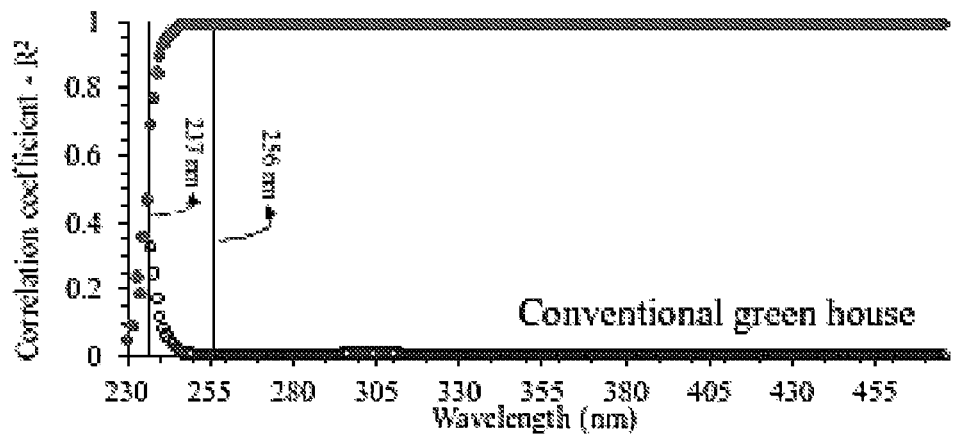
Figure 8D:
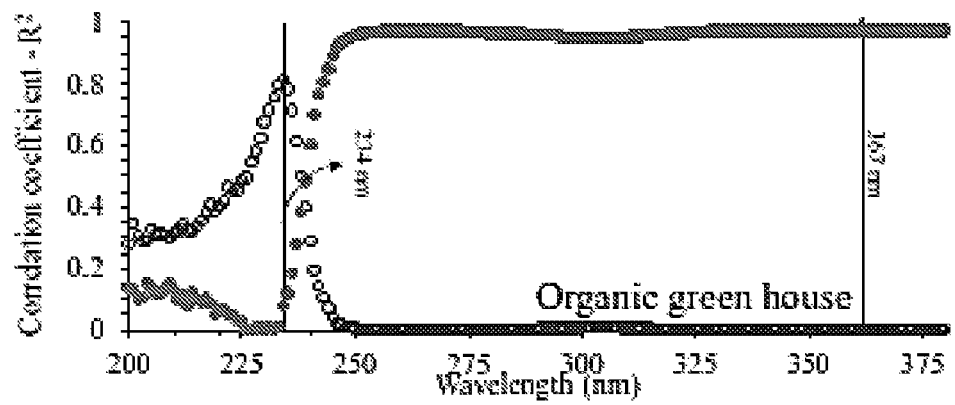
Figure 8E:
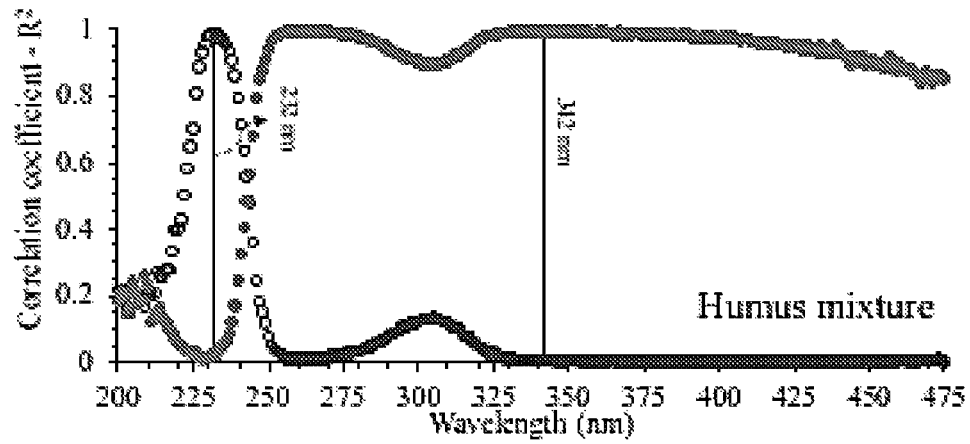
Figure 9B:
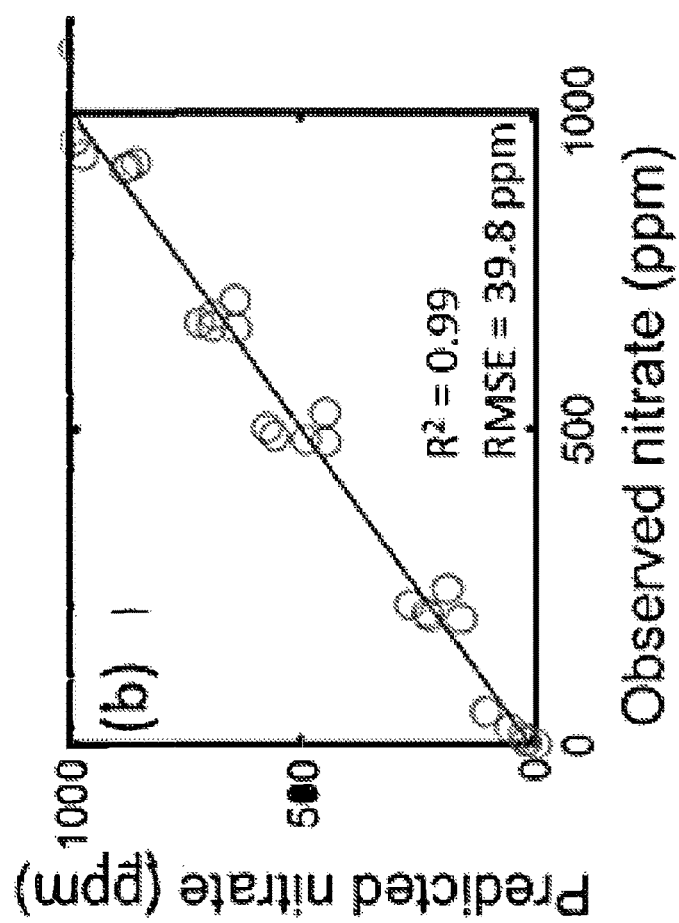
Figure 9A:
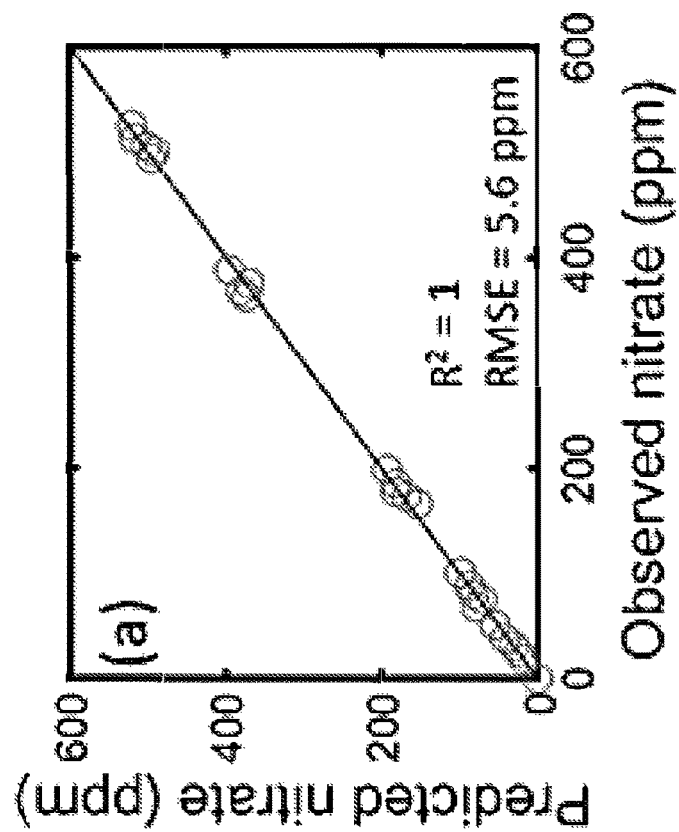

Spectral analyses and calibration for nitrate concentrations were performed by analyzing the absorbance spectrum of water samples obtained from five sources: four agricultural soils and a water extract of composted manure humus. A stock solution was obtained for each source through water extraction with double distilled water (DDW) to achieve a maximal concentration of the natural mineral and organic components of the soil porewater. Since each soil has its own DOC composition, which impacts the absorption spectrum differently, the original DOC composition was preserved through dilution and nitrate spiking processes. Accordingly, the stock solutions were spiked with nitrate to form the first vector of samples containing variable nitrate and DOC concentrations, which preserved the natural DOC composition. Other samples were then diluted to form a second vector containing a series of solutions with a range of DOC concentrations, as shown in FIG. 4. More specifically, the table in the figure shows: soil water sample matrices with variable concentrations of nitrate and DOC prepared for the water samples produced from soil obtained from the Afek open field. For example, sample A1 contains 26 ppm of DOC and 956 ppm of nitrate, while sample D2 contains 14 ppm of DOC and 221 ppm of nitrate. The measurement standard error has been removed from these values for visual clarity.

The dual-wavelength calibration procedure analyzed the absorption spectrum to determine two discrete wavelengths: (1) the second wavelength is associated with the absorbance values that exhibit a maximum correlation to the nitrate concentrations, and (2) the first wavelength is associated with a maximal correlation to the DOC concentration in the wavelength range that is not impacted by nitrate concentration. Then, the absorbance values at the selected two wavelengths, along with the known nitrate and DOC concentrations, were processed in a multivariate regression analysis to generate a calibration equation that reduces the DOC interference with the absorbance spectrum, thus enabling the determination of nitrate concentration in the examined soil water solution. Once such a calibration equation is obtained, new soil water samples with unknown nitrate and DOC concentrations can be analyzed for nitrate concentration determination based on the absorbance measured at two discrete wavelengths.

Example 1

Topsoil samples were collected in November 2019 from four agricultural fields located in the northern and southern parts of Israel's Mediterranean Coastal Plain, including two greenhouses used to grow high-quality vegetables. One site is a greenhouse that practices organic cultivation methods. This greenhouse, which primarily relies on organic matter (composted manure) as the main fertilizer source, was selected to represent soil rich in organic matter as a source of DOC. Additionally, soil was collected from another greenhouse in the same area that practices conventional fertilization methods, which are mainly based on industrial soluble nitrogen fertilizers. Both greenhouses are located in the southern part of Israel's Coastal Plain, near Kibbutz Zikim. The other two soils were collected from fields that are used for rotating seasonal crops, mostly rain-fed. One represents sandy soils from an area that is located in the central part of Israel's Coastal Plain, by Nir Galim village, and the other represents heavy clay soil from the Coastal Plain's northern section, by Kibbutz Afek. The regional climate in these sites is characterized as Mediterranean, with hot, dry summers (April to September) and cold, wet winters (October to March). FIG. 5 provides additional information on the selected soils, such as the sampled field site locations, site types, and texture classifications. Additionally, a water extract of commercial humus, which was made from composted manure (Dovrat. LTD, Israel), was examined to represent the potential impact of DOC originating from compost enrichment in soil on the spectral analysis of the soil porewater.

The soil's water samples examined in this work were obtained by making a 1:2 soil/DDW volume ratio mixture. The mixture was left to stand for 24 hours to achieve effective chemical equilibrium of the soil's pore water and to obtain the maximal DOC concentration in the water solution. The soil and liquid phases were then separated by a standard laboratory centrifuge, and the suspended solids were removed by a 0.22-μm membrane filter. The initial values of DOC and total nitrogen (TN) in the soil water samples were estimated by an Analytic Jena multi-N/C 2100s TOC/TN analyzer, while nitrate concentration was determined by a Dionex ICS 5000 Ion chromatograph.

In order to assess the specific contribution of nitrate and DOC to the absorption spectrum, a matrix of soil water solutions containing variable concentrations of DOC and nitrate was created for each soil. To preserve the original chemical composition of the soil's DOC, the samples were diluted to achieve a range of DOC levels. Other samples from each site were then spiked with a concentrated potassium nitrate solution to form a range of variable nitrate concentrations. Accordingly, a matrix of site-specific water samples, composed of 25 to 30 water samples of variable combinations of original DOC and nitrate concentrations, ranging from zero to ~1000 ppm nitrate and zero to ~200 ppm DOC, was produced for each soil from the four examined soils and the humus extract. The sample matrices were then scanned by a TECAN Spark 10M multimode microplate reader spectrophotometer to determine their absorbance spectrum between 200 and 1000 nm, with a scan resolution of 1 nm. The light absorbance was defined by the Lambert-Beer equation (Eq. 1):

$$\text{Absorbance} = -\log_{10} \frac{I}{I_0} \quad (1)$$

Where I is the light intensity after passing through the examined solution, and $I_0$ is the light intensity after passing through a reference water sample (DDW).

An example of the water sample matrices of varied DOC and nitrate concentrations is presented in FIG. 5 for the Afek open crop field.

The samples' chemical and spectral characteristics were analyzed with curve-fitting tools to obtain a multivariate polynomial calibration equation for nitrate and DOC using the MATLAB 2020a curve-fitting tool. Additionally, p-values, the correlation coefficients ($R^2$), and RMSE values were obtained by the MATLAB 2020a fitlm( ) function.

Applying UV absorption techniques to analyze the aqueous nitrate concentration typically results in a linear correlation between nitrate concentrations and the absorbance values. However, from empirical research, it was found that this correlation is not straightforward for natural soil water containing DOC, as UV absorption may increase as the result of a superposition of the absorptions caused by the nitrate and the DOC in the examined solution. For example, a series of solutions produced from the DDW mixture with the Nir Galim soil sample, with variable nitrate concentrations and a similar level of DOC, showed a linear correlation with the absorption values (curves (a) in FIG. 6B). More specifically, FIGS. 6A-6E show nitrate concentration vs. absorbance at 235 nm and 238 nm of water samples produced from the agricultural soils and the humus mixture. However, a similar series of nitrate concentrations with an increased DOC level showed a similar trend, although with a greater absorbance level (curve (b) in FIG. 1). This phenomenon of identical gradients between the trendlines associated with the high and low DOC levels implied that the DOC contribution to the overall absorbance is consistent and quantifiable; therefore, they may be modeled and corrected to enable nitrate spectral analyses. This phenomenon was also reported by Yeshno et al., "A novel analytical approach for the simultaneous measurement of nitrate and dissolved organic carbon in soil water," Hydrol. Earth Syst. Sci., 25(4), 2159-2168, doi: 10.5194/hess-25-2159-2021, 2021., although at a wavelength of 300 nm. The measurements displayed in the present example were between 235 nm and 238 nm, as in these wavelengths, the nitrate spectral analysis shows a strong, although unsaturated, absorbance signal. Still, the relationship between nitrate and DOC concentrations and the UV absorption of a large solution matrix may not be as straightforward as demonstrated by the 2D model presented in FIGS. 6A-6E, thus requiring further investigation.

Nitrate and DOC absorb light on a broad spectrum in the UV region. While some wavelengths on the spectrum exhibit a stronger correlation to the nitrate concentrations, other wavelengths are more suitable for measuring DOC levels. As such, a correlation analysis of the absorbance spectrum was conducted by calculating the correlation coefficient ($R^2$) between an array of nitrate concentration vectors and their corresponding absorbance vectors for each discrete wavelength in the UV spectrum (FIG. 7). More specifically, FIG. 7 shows correlation coefficients and their corresponding wavelengths across the UV spectrum for the samples produced for the Afek open crop field. For example, the correlation coefficient between nitrate concentrations and the absorbance intensities measured at 240 nm, for soil water samples taken from the Afek open crop field was $R^2$=0.967, as also shown in FIG. 7. By plotting the correlation coefficient values ($R^2$) vs. their corresponding wavelengths, a visual identification can be made for the wavelength showing higher affinity to the DOC and nitrate in the water sample matrices obtained from each agricultural field—FIGS. 8A-8E. More specifically, FIGS. 8A-8E show $R^2$ vs. wavelength analyses for soil water sample matrices produced for the agricultural sites and the humus mixture. Since the calibration is a site-specific feature, the correlation analyses were performed for each site separately. The examined spectrum's upper limit was set to 380 nm during these analyses. The rationale for setting this specific boundary was that nitrate mainly absorbs light in the UV region, from 220-240 nm, and at a secondary peak around 300 nm, while the DOC effect on the absorbance spectrum usually decays when approaching the visible spectrum. The lower limit for the correlation analyses was set to 230 nm since, at lower than 230 nm, the signal becomes saturated due to the absorbance caused both by nitrate and DOC. Performing the correlation analysis on a saturated signal may result in a false-positive high $R^2$ and, thus, may indicate a wavelength that does not exhibit the highest affinity to the nitrate or DOC concentrations.

The analyses of the variations in the $R^2$ values over the examined UV spectrum for the humus mixture, the Afek open crop field, and the organic greenhouse water sample matrices showed distinct correlation peaks for nitrate and DOC. For example, the appropriate wavelengths for measuring nitrate and DOC in the samples produced from the Afek soil were 239 nm for nitrate and 259 nm for the DOC [nitrate=lower curve in each plot, DOC=upper curve]. Yet, the correlation curves for the water samples obtained for the conventional greenhouse and Nir Galim did not show a clear peak for nitrate. This behavior explains that the spectral absorbance analysis of these two site samples showed high absorbance signal saturation stretching further to 235 nm. To deal with the possible interference with the correlation coefficient calculation, the lower examined spectrum for these samples was set just at the edge of the signal saturation levels, at 236 nm for the Nir Galim open crop field, and 237 nm for the conventional greenhouse. Interestingly, while the correlation analyses showed that the conventional greenhouse and the Nir Galim and Afek open crop fields had a peak correlation to DOC at a narrow range between 256 nm and 259 nm, the organic greenhouse and the humus mixture DOC showed the best fit at much higher wavelengths on the UV spectrum (367 nm and 342 nm, respectively). This behavior is because the organic greenhouse crop primarily relies on compost supplements as its main nutrient source. As such, the organic greenhouse soil is highly enriched with organic manure compost, similar to that found in the humus mixture water samples. Thus, the DOC level in the organic greenhouse soil exhibited some similarity to the DOC found in the water samples produced from the humus mixture.

Nevertheless, the DOC levels in the organic greenhouse and the humus mixture also showed a very high correlation between 256 nm and 259 nm, similarly to the Afek and Nir Galim open crop fields and the conventional greenhouse.

Figure 10:
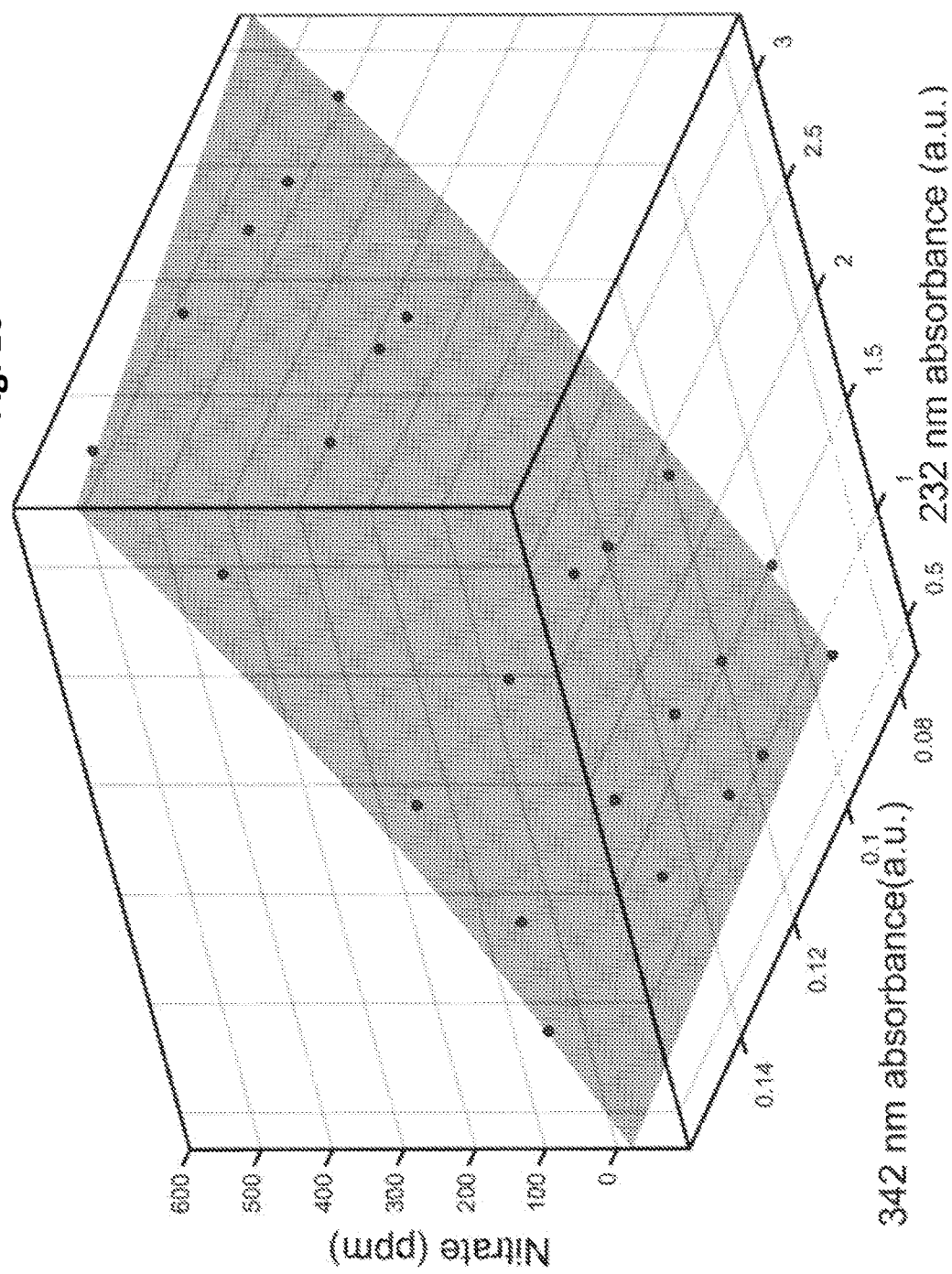
FIG. 10 shows a 3D projection of the nitrate concentration as a function of the absorbance at 232 nm and 342 nm for water samples obtained from a humus mixture.

Quantifying the effect of nitrate and DOC on the absorbance spectrum was conducted by a multivariate regression model. The regression model was based on the known nitrate concentrations and the absorbance intensities at the wavelengths that showed the highest correlation between the nitrate and the DOC concentrations in the sample matrices of each site. When projected on a 3D domain, the data distribution in space exhibited a curved plane (FIG. 10). More specifically, FIG. 10 shows a 3D projection of the nitrate concentration as a function of the absorbance at 232 nm and 342 nm for water samples obtained from a humus mixture. The curved plane was mathematically defined through a second-order polynomial equation, where nitrate concentrations can be calculated as a function of the absorbance at the two wavelengths that were identified through the correlation analyses (Eq. 2):

$$\text{Nitrate}(\text{Abs}_{doc},\text{Abs}_N) = P_{00} + P_{10} \times \text{Abs}_N + P_{01} \times \text{Abs}_{doc} + p_{20}^2 + P_{11} \times \text{Abs}_N \times \text{Abs}_{DOC} \quad (2)$$

Where $\text{Abs}_{DOC}$ (a.u.—arbitrary units) indicates the absorbance at the wavelength associated with the DOC concentrations, $\text{Abs}_N$ (a.u.) indicates the absorbance measured at the wavelength associated with nitrate concentrations, and $P_{00,10,01,20,11}$, are the coefficients obtained by the regression model.

The multivariant polynomial calibration equation for nitrate estimation was obtained by analyzing soil water chemical and optical data by MATLAB 2020a curve fitting tool. It was found that the data distribution in space exhibited a curved plane and was mathematically defined as a second-order polynomial equation by applying a multivariate regression model. From this model, nitrate concentration was determined as a function of the absorbance intensity at two discrete wavelengths.

Yeshno et al. (WO 2018/104939, and "A novel analytical approach for the simultaneous measurement of nitrate and dissolved organic carbon in soil water," Hydrol. Earth Syst. Sci., 25(4), 2159-2168, doi: 10.5194/hess-25-2159-2021, 2021) demonstrated that the DOC's interference with the nitrate absorbance spectrum differs from site to site due to the soil characteristics. Therefore, the polynomial calibration equation for nitrate is a site-specific feature. Nonetheless, it was concluded that the impact of DOC on the absorption spectrum, due to its chemical composition, remained relatively constant over time when the soil porewater samples were taken at the same location by a permanently installed suction lysimeter. This implies that once the required wavelength has been identified and the initial calibration equation has been obtained, it can be repeatedly used for this particular site for a long duration (years).

The multiple-wavelength analytical calibration procedure was further tested for estimating nitrate in the soil water of four additional agricultural sites and a humus mixture containing variable concentrations of DOC, ranging from 1.6 to about 200 ppm, and nitrate concentrations ranging from a few ppm to about 1000 ppm (FIGS. 9A-9E). More specifically, FIGS. 9A-9E show observed vs. predicted nitrate concentrations as obtained for: (a) a humus mixture, (b) Afek: open crop field, (c) a conventional greenhouse, (d) Nir Galim: open crop field, and (e) an organic greenhouse. Nitrate concentrations predicted by the multivariate model showed adequate results with a general correlation of $R^2 > 0.97$ and a residual mean square error (RMSE) ranging from 5 ppm to 59 ppm nitrate (FIGS. 9A-9E). The current RMSE, which can stretch to almost 60 ppm error, does not accord with the current state-of-the-art standard laboratory equipment and apparatus such as ion chromatograph (IC) or Total Nitrogen (TN) analyzer. However, nitrate concentrations in soil may range from several tens to several thousand ppm nitrate. As such, despite the expected measurement error, the prediction made by the presented spectral analysis is still very much within the necessary and relevant margin to produce the information needed for farmers to determine adequate nutrient levels for their crops, as well as to optimize fertilizer application during the growing cycle. Detailed information on the multivariate calibration models, the calibration coefficient, and the selected wavelengths obtained for all sites can be found in FIG. 11. More specifically, the table in FIG. 11 shows calibration coefficients obtained by the multivariate regression model, selected wavelengths, and statistics. Additionally, as demonstrated in FIGS. 9A-9E, the Afek and Nir Galim open crop fields and the conventional greenhouse showed maximal correlation to the DOC at a narrow band between 256 nm and 259 nm. However, the organic greenhouse and humus mixture showed optimal wavelengths further on the absorbance spectrum, at 367 nm and 342 nm, respectively. Yet, since the $R^2$ values for the organic greenhouse and humus mixture samples, from 256 nm to 259 nm, are still high ($R^2 > 0.97$), estimating the DOC concentrations could also have been practically performed in this region on the absorbance spectrum. Accordingly, FIG. 11 shows the $R^2$ and RMSE for nitrate predictions made for the organic greenhouse and humus mixture samples when the wavelengths associated with the DOC concentrations were set to 259 nm.

Figure 12B:
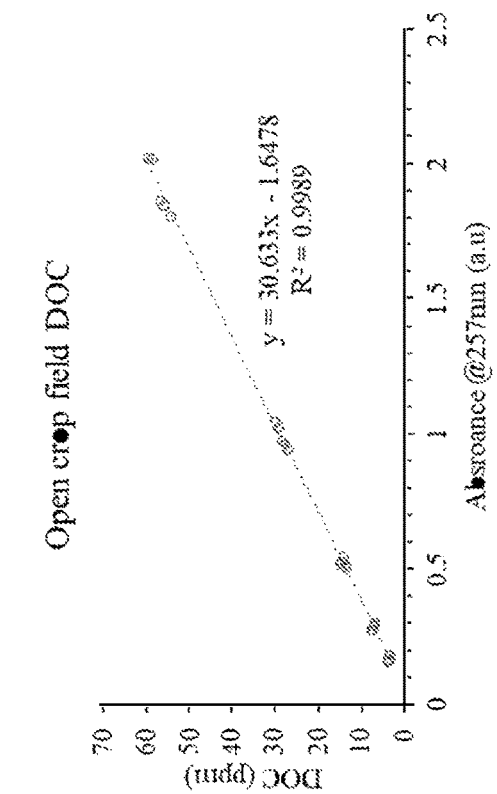
FIGS. 12A-12B are two charts showing the DOC levels as a function of absorbance at two discrete wavelengths.
Figure 12A:
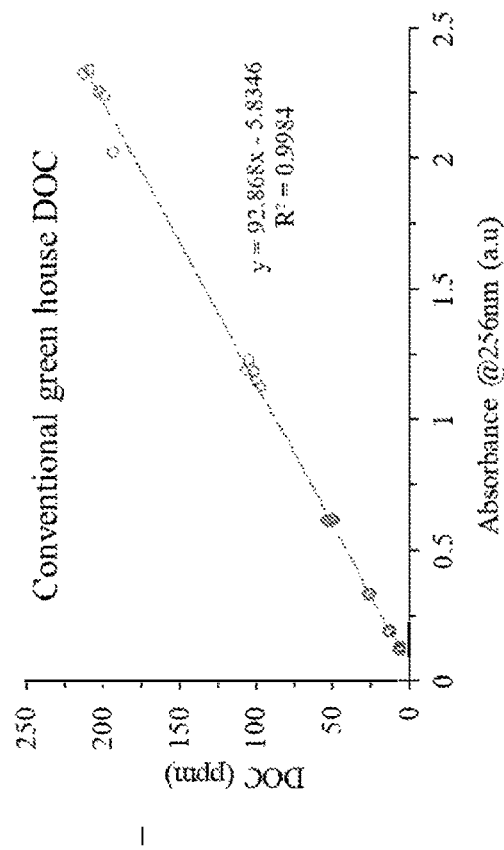

As mentioned, nitrate monitoring in cultivated lands is essential for optimizing fertilizer application during agricultural activity, preserving resources, and reducing the environmental impact caused by the agricultural industry. Yet DOC monitoring in cultivated soil is essential for similar reasons. First, DOC also contains nitrogen, which can turn into ammonium through ammonification and later to nitrate through nitrification. Additionally, DOC serves as an electron donor in the identification processes that turn nitrate into nitrous oxide gas, a highly effective greenhouse gas. As such, knowing the DOC levels in the soil can assist in predicting the rate at which nitrate would be reduced to nitrous oxide, and additionally, the monitoring of DOC levels can also assist in predicting the rate at which compost is applied by farmers would be reduced to nitrate. As such, the monitoring of DOC is also advantageous for better resource management in cultivated lands. FIGS. 12A and 12B are two charts showing the DOC levels as a function of absorbance at two discrete wavelengths. Thus, DOC levels can be determined by the nitrate sensor of the invention as well.

Example 2

Open Crop Field Experiment—Monitoring System Calibration

The calibration of the system was performed by spiking and diluting porewater samples as described above. Table 1 shows raw data acquired during the spiking and dilution calibration process for porewater samples obtained during an experiment conducted at the Ramat Negev Desert Agro-Research.

TABLE 1

| Nitrate (ppm) | DOC | Absorbance at 245.27 nm | Absorbance at 265.66 nm |
| --- | --- | --- | --- |
| 1298 ± 79 | 2.35 | 0.759 | 0.288 |
| 887 ± 54 | 2.61 | 0.624 | 0.282 |
| 373 ± 23 | 2.94 | 0.461 | 0.279 |
| 64 ± 4 | 3.13 | 0.341 | 0.278 |
| 1346 ± 82 | 4.7 | 0.865 | 0.363 |
| 940 ± 57 | 5.22 | 0.760 | 0.371 |
| 433 ± 26 | 5.87 | 0.621 | 0.386 |
| 128 ± 8 | 6.26 | 0.513 | 0.387 |
| 1442 ± 88 | 9.4 | 1.074 | 0.535 |
| 1047 ± 64 | 10.44 | 1.012 | 0.560 |
| 553 ± 34 | 11.75 | 0.914 | 0.594 |
| 256 ± 16 | 12.53 | 0.846 | 0.609 |
| 1634 ± 99 | 18.79 | 1.449 | 0.853 |
| 1260 ± 77 | 20.88 | 1.426 | 0.906 |
| 793 ± 48 | 23.48 | 1.409 | 0.980 |
| 512 ± 31 | 25.05 | 1.382 | 1.015 |

Figure 13:
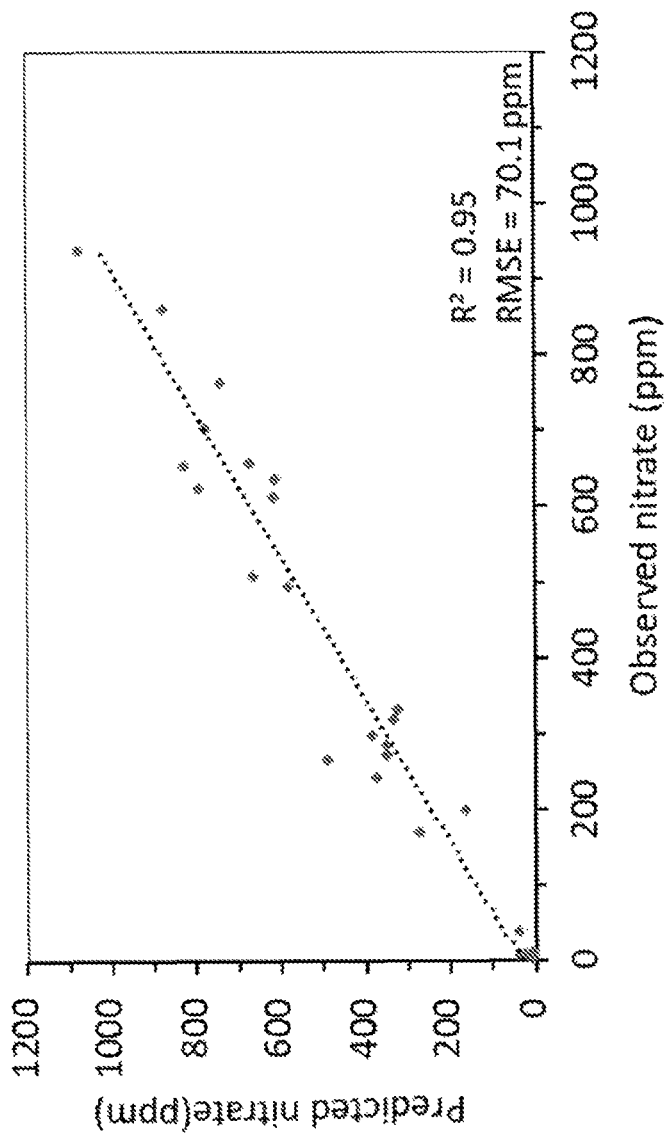
FIG. 13 shows Predicted vs. observed nitrate concentration at a site, as obtained during an experiment.

Approval for the validity of the sensor measurement for nitrate was gained by comparing the optically obtained results with standard laboratory analysis for nitrate (FIG. 13). FIG. 13 shows Predicted vs. observed nitrate concentration at the Ramat Negev Desert Agro-Research open crop field experiment.

Figure 14:
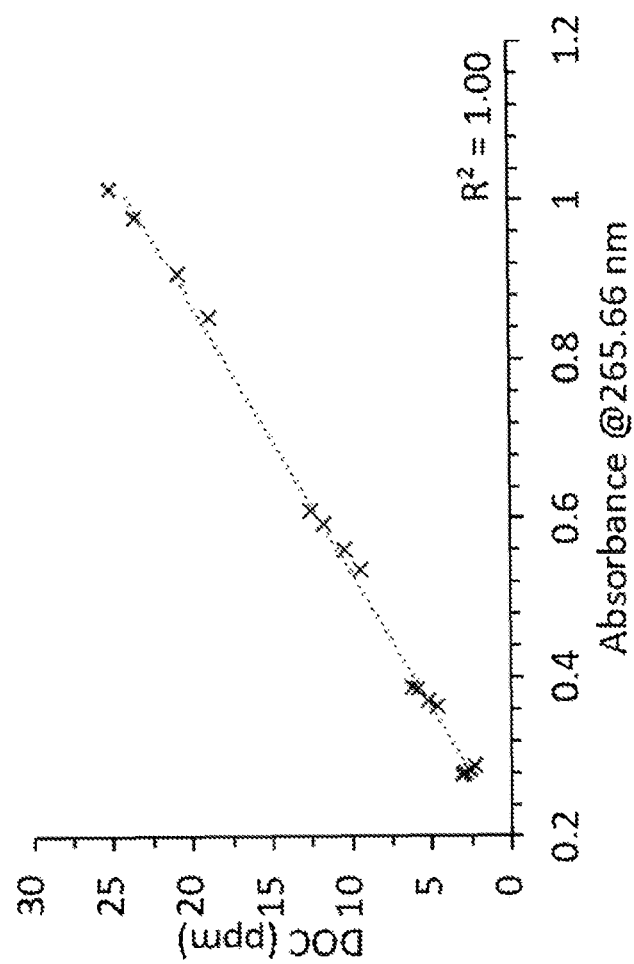
FIG. 14 shows DOC concentration vs. absorbance at 265.66 nm for solutions obtained by dilution and spiking processes during an experiment.
Figure 15:
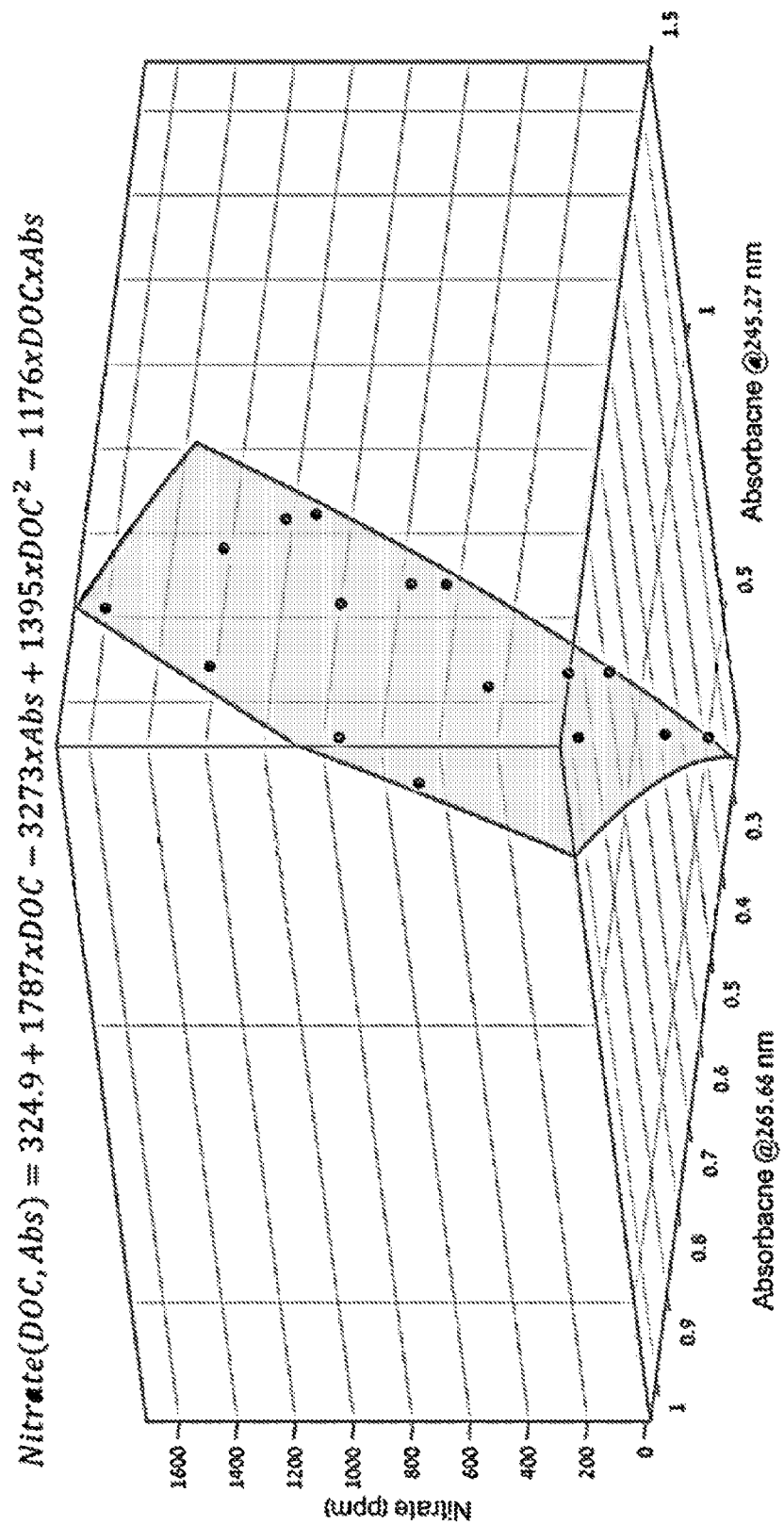
FIG. 15 shows a 3D projection of nitrate concentration as a function of the absorbance at 265.66 nm and the absorbance at 245.27 nm for porewater samples, as obtained during an experiment.

FIG. 14 shows the DOC concentration vs. absorbance at 265.66 nm for the solution obtained from the dilution and spiking processes at the Ramat Negev Desert Agro-Research open crop field experiment. It presents the correlation between the absorbance at 265.66 nm and the DOC concentration found in a matrix of samples obtained by the dilution/spiking procedure. Thus, DOC concentration can be determined by applying linear regression to the same data that would later be used to calibrate the system for nitrate concentrations. FIG. 15 shows a 3D projection of the nitrate concentration as a function of the absorbance at 265.66 nm and the absorbance at 245.27 nm for porewater samples matrix obtained from the Ramat Negev Desert Agro-Research open crop field experiment. The 3D projection of the matrix of samples and the calibration equation obtained for the porewater matrix from the cultivated tomato field where the sensor was installed. The wavelengths 245.27 nm and 265.66 nm for nitrate and DOC were chosen to measure DOC+nitrate and DOC and have shown an adequate fit of $R^2=0.99$ and RMSE=17.66 ppm.

Example 3

Open Crop Field Experiment—Real-Time Nitrate Monitoring

Figure 16:
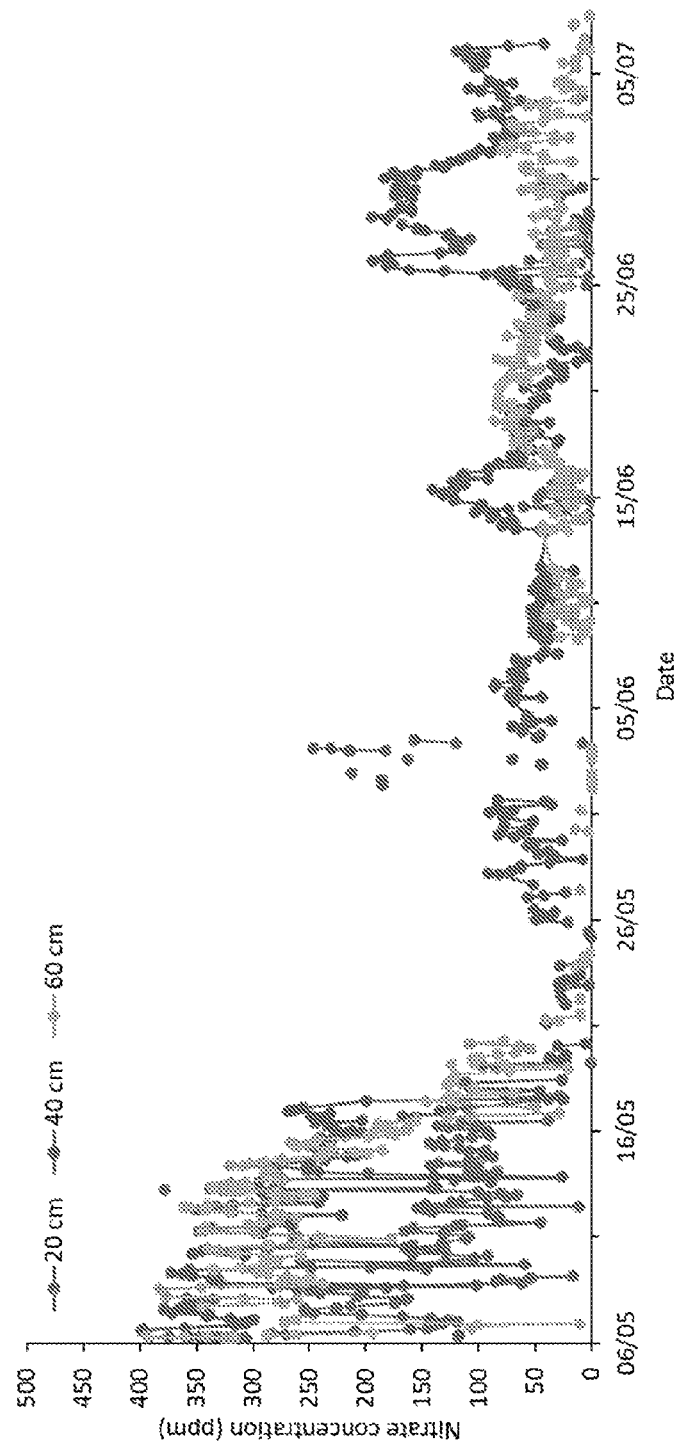
FIG. 16 shows nitrate concentrations at depths of 20, 40, and 60 cm as obtained in an experiment for a plot with low fertilizers application regime.

The experiment at Ramat Negev Desert Agro-Research open crop field was performed under two plots that were separated by higher and lower fertilizer application regimes. Nitrate measurement made by the sensor at the plot with the low fertilizer treatment shows that for most of the growing cycle, nitrate levels had remained close to zero at 20 cm, while most nitrate accumulation had occurred at depths of 40 cm and 60 cm. FIG. 16 shows nitrate concentrations at depths of 20, 40, and 60 cm at the Ramat Negev Desert Agro-Research open crop field experiment for the plot with low fertilizers application regime.

Figure 17:
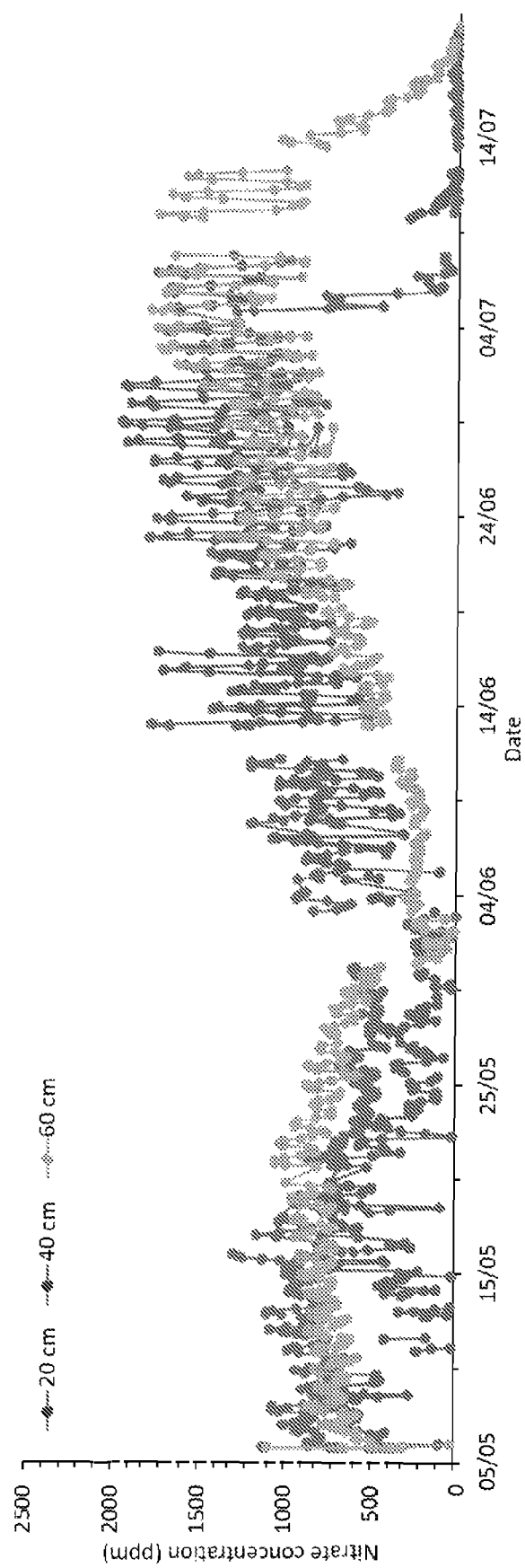
FIG. 17 shows nitrate concentrations at depths of 20, 40, and 60 cm as obtained in an experiment for a plot with high fertilizers application regime.

In the case of high fertilizer treatment, however, nitrate levels had remained elevated in the soil at all depths during most of the growing season. Additionally, when higher levels of N were introduced into the soil, strong daily oscillations in nitrate concentrations were visible at all three depths. FIG. 17 shows Nitrate concentrations at depths of 20, 40, and 60 cm at the Ramat Negev Desert Agro-Research open crop field experiment for the plot with high fertilizers application regime.

As noted above, the invention shows, among others, how to determine a calibration equation that is most suitable for the specific site. In an embodiment of the invention, the system may include several pre-stored calibration equations. When arriving to a new site, the system may determine the calibration equation which is most suitable for that site from among the pre-stored equations. In an embodiment of the invention, this may be done by applying one or more pairs of light sources and detectors, operating in other wavelengths than said first and second wavelengths mentioned above.

While some embodiments of the invention have been described by way of illustration, it will be apparent that the invention can be carried into practice with many modifications, variations, and adaptations, and with the use of numerous equivalent or alternative solutions that are within the scope of persons skilled in the art, without departing from the spirit of the invention or exceeding the scope of the claims.

The invention claimed is:

1. A method for determining a concentration of nitrate in a water sample collected from soil at a given site, said water sample also contains an unknown composition and unknown concentration of Dissolved Organic Carbon (DOC), the method comprising:
a. during an offline stage:
collecting a testing sample from the site;
analyzing the testing sample to determine a first wavelength in which a light absorbance by the testing sample is correlated to the concentration level of the DOC in the testing sample;
further analyzing the testing sample to determine a second wavelength in which a light absorbance by the testing sample is correlated to the concentration level of the nitrate in the testing sample;
based on the above two-step offline analysis, creating a multivariate polynomial calibration equation for use during a real-time stage analysis; and
b. during a real-time stage analysis:
collecting a real-time water sample from the site's soil;
impinging on the real-time sample light in said first wavelength, measuring the real-time sample's absorbance, and recording the measured absorbance as a first absorbance value;
impinging on the real-time sample light in said second wavelength, measuring the real-time sample's absorbance, and recording the measured absorbance as a second absorbance value; and
substituting in said calibration equation the first absorbance value and the second absorbance value, or values relative thereon, and calculating to determine the nitrate concentration in the real-time sample.

2. The method of claim 1, wherein said offline stage comprises a creation a calibration matrix of samples from the from the testing sample, and wherein said analyses steps are performed on the calibration matrix.

3. The method of claim 2, wherein said first wavelength and said second wavelength are determined by:
dividing the calibration matrix of samples to a plurality of sub-samples, and dividing the plurality of sub-samples to two groups;
differently enriching in a controlled manner the sub-samples in said first group by nitrate;

differently diluting in a controlled manner the sub-samples in said second group by DDW;

dividing a wide light spectrum into a plurality of wavelengths to form a plurality of discrete wavelengths;

in each discrete wavelength, impinging light on each sub-sample within said two groups, and recording respectively the absorbance by the sub-sample; and analyzing said respective absorbances to determine said first wavelength and said second wavelength.

4. The method of claim 3, wherein the creation of the calibration equation is based on applying a multivariate regression technique on the variety of recorded absorbances.

5. The method of claim 1, wherein at least one of said correlations is a linear or higher order correlation.

6. The method of claim 1, wherein the offline stage is performed separately for each site, to determine a calibration equation that is specific to each site.

7. The method of claim 1, for further determining the concertation of DOC in the sample.

8. The method of claim 1, wherein said correlations define spectrum regions, respectively, in which the extent of correlation $R^2$ is higher than 0.8.

9. The method of claim 1, wherein said correlations define spectrum regions, respectively, in which the extent of correlation $R^2$ is higher than 0.85, 0.9, 0.95, or 0.98 in either or both said concentration levels determinations.

10. A system for determining in real-time a concentration of nitrate in a water sample collected from soil at a given site, said water sample also contains an unknown composition and unknown concentration of Dissolved Organic Carbon (DOC), the system comprising:

a first light source operating at a predetermined first wavelength in which light absorbance by the sample is correlated to a concentration level of DOC in the sample;

a second light source operating at a second wavelength in which light absorbance by the sample is correlated to a concentration level of nitrate in the sample;

at least partially transparent cell for containing said water sample, wherein each said light sources is directed to impinge light on said cell containing the sample; and an analysis unit receiving a first sample absorbance in said first wavelength, and a second sample absorbance in said second wavelength, and calculating the concentration of nitrate in the sample based on said two absorbances, and a predetermined calibration equation;

wherein said correlations define spectrum regions, respectively, in which the extent of correlation $R^2$ is higher than 0.8.

11. The system of claim 10, wherein at least one of said correlations is a linear or higher order correlation.

12. The system of claim 10, wherein at least one of said light sources are of LED or UV lamp.

13. The system of claim 10, wherein said predetermined calibration equation is specifically determined for each given site.

14. The system of claim 10, for further determining the concentration of the DOC in the water sample.

15. The system of claim 10, wherein said correlations define spectrum regions, respectively, in which the extent of correlation $R^2$ is higher than 0.8.

16. The system of claim 10, wherein said correlations define spectrum regions, respectively, in which the extent of correlation $R^2$ is higher than 0.85, 0.9, 0.95, or 0.98 in either or both said concentration levels determinations.

* * * * *